United States Patent
Yang

(10) Patent No.: US 12,289,644 B2
(45) Date of Patent: Apr. 29, 2025

(54) SYSTEMS AND METHODS FOR RELEASING CANDIDATE TARGET CELL RESOURCES IN MULTI-CONNECTIVITY OPERATION

(71) Applicant: ZTE CORPORATION, Guangdong (CN)

(72) Inventor: Li Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 467 days.

(21) Appl. No.: 17/705,031

(22) Filed: Mar. 25, 2022

(65) Prior Publication Data

US 2022/0217586 A1 Jul. 7, 2022

Related U.S. Application Data

(63) Continuation of application No. PCT/CN2019/109011, filed on Sep. 29, 2019.

(51) Int. Cl.
*H04W 36/00* (2009.01)

(52) U.S. Cl.
CPC . *H04W 36/0027* (2013.01); *H04W 36/00698* (2023.05)

(58) Field of Classification Search
CPC .................. H04W 36/0027; H04W 36/00698
See application file for complete search history.

(56) References Cited

U.S. PATENT DOCUMENTS

| | | | |
|---|---|---|---|
| 2019/0104452 A1* | 4/2019 | Park | H04W 36/185 |
| 2020/0296637 A1* | 9/2020 | Teyeb | H04L 5/001 |
| 2020/0396661 A1* | 12/2020 | Wu | H04W 36/0094 |
| 2021/0007175 A1* | 1/2021 | Shi | H04L 63/123 |
| 2022/0295571 A1* | 9/2022 | Da Silva | H04W 74/0866 |

(Continued)

FOREIGN PATENT DOCUMENTS

| | | |
|---|---|---|
| AU | 2018237955 A1 | 9/2019 |
| CN | 108990101 A | 12/2018 |
| CN | 109716855 A | 5/2019 |

(Continued)

OTHER PUBLICATIONS

3GPP 3rd Generation Partnership Project; Technical Specification Group Radio Access Network; Evolved Universal Terrestrial Radio Access (E-UTRA) and NR; Multi-connectivity; 3GPP TS 37.340 VI.1.0 1 (Oct. 2017) Technical Specification Oct. 31, 2017(Oct. 31, 2017).

(Continued)

*Primary Examiner* — Jamal Javaid
*Assistant Examiner* — Ryan C Kavleski
(74) *Attorney, Agent, or Firm* — Foley & Lardner LLP

(57) ABSTRACT

Systems and methods for wireless communications are disclosed herein. In one embodiment, a master node (MN) determines that a candidate target PScell/SCG in a candidate target secondary node (SN) needs to be released, canceled, or deleted. The candidate target SN is involved in a conditional SN addition or change multi-RAT dual connectivity (MR-DC) procedure of a wireless communication device. The MN and a source SN are currently configured to provide communication services to the wireless communication device. The MN requests to release, cancel, or delete the at least one candidate target PScell/SCG in the candidate target SN using a first signaling procedure.

20 Claims, 14 Drawing Sheets

(56) References Cited

U.S. PATENT DOCUMENTS

2022/0408322 A1* 12/2022 Uchino ........... H04W 36/00692

FOREIGN PATENT DOCUMENTS

| WO | WO-2018/174058 A1 | 9/2018 |
| WO | WO-2018/174062 A1 | 9/2018 |
| WO | WO-2019/031216 A1 | 2/2019 |

OTHER PUBLICATIONS

International Search Report and Written Opinion for PCT Appl. No. PCT/CN2019/109011 mailed Jun. 29, 2020 (8 pages).
First Office Action for CN Appl. No. 20198009958.9, dated May 7, 2023 (with English translation, 11 pages).

* cited by examiner

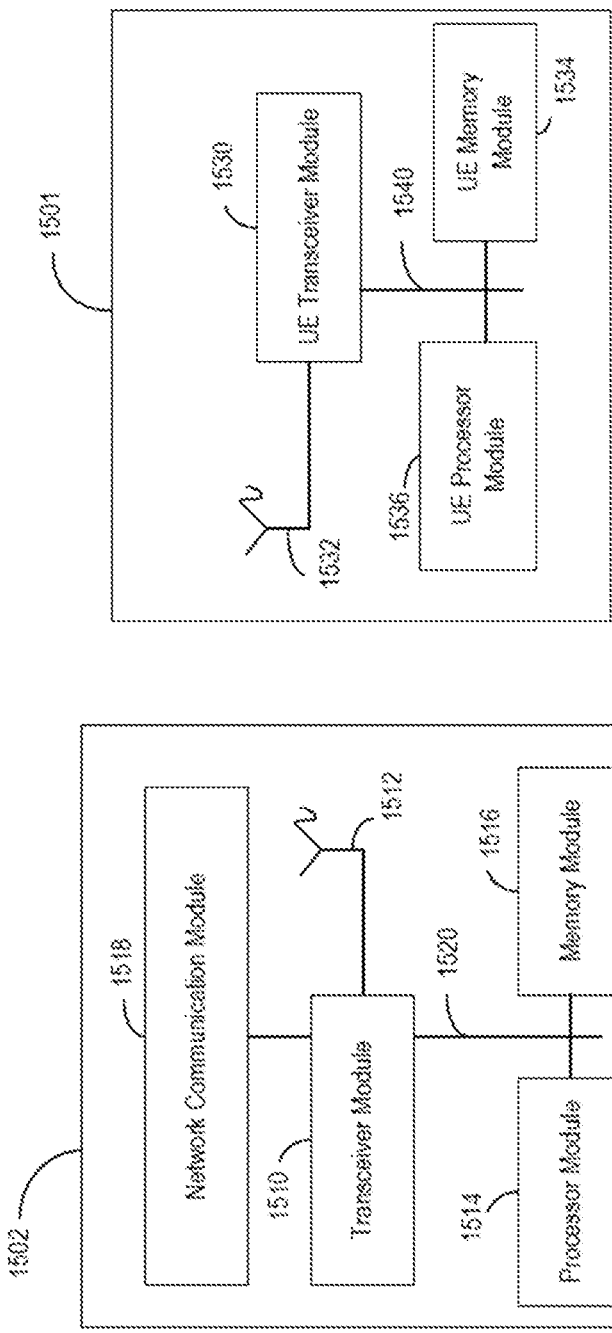

SYSTEMS AND METHODS FOR RELEASING CANDIDATE TARGET CELL RESOURCES IN MULTI-CONNECTIVITY OPERATION

CROSS-REFERENCE TO RELATED APPLICATION

This application claims the benefit of priority under 35 U.S.C. § 120 as a continuation of PCT Patent Application No. PCT/CN2019/109011, filed on Sep. 29, 2019, the disclosure of which is incorporated herein by reference in its entirety

TECHNICAL FIELD

The present disclosure relates to the field of telecommunications, and in particular, to the release, cancelation, or deletion of communication resources of candidate conditional handover (CHO) primary secondary cell (PScell)/secondary cell group (SCG) in multi-connectivity operation.

BACKGROUND

The land-based 5th Generation Mobile Communication Technology (5G) cellular mobile communication system includes two subsystems—the next-generation core network referred to as the 5th Generation Core (5GC) and the next-generation wireless access network referred to as the Next Generation Radio Access Network (NG-RAN). The 5GC includes, for example, an Access Mobility Function (AMF), a Session Management Function (SMF), a User Plane Function (UPF), and other network entities/nodes. The AMF provides for mobility access. The SMF provides for session management. The UPF provides for user plane functionalities. The NG-RAN includes base stations providing service via at least two different Radio Access Technologies (RATs). The next generation eNodeB (ng-eNB), the air interface of which can support the Evolved Universal Terrestrial Radio Access (E-UTRA) RAT system, is evolved from the 4G eNB. The gNB with the new physical layer air interface design supports the New Radio (NR) RAT system. Logical interfaces have been developed for related network element node entities. NG-RAN base station (e.g., gNB or ng-eNB), via a standardized NG interface, connects to the 5GC bidirectionally, including an NG-Control Plane (NG-C) connection for signaling transmission and an NG-User Plane (NG-U) connection for user data transmission. The NG-RAN base stations (e.g., gNB or ng-eNB) are bidirectionally connected to each other through the Xn interface, which includes the Xn-Control Plane (Xn-C) connection and the Xn-User Plane (Xn-U) connection.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some embodiments, a master node (MN) determines that a candidate target PScell/SCG in a candidate target secondary node (SN) needs to be released, canceled, or deleted. The candidate target SN is involved in a conditional SN addition or change multi-RAT dual connectivity (MR-DC) procedure of a wireless communication device. The MN and a source SN are currently configured to provide communication services to the wireless communication device. The MN requests to release, cancel, or delete the at least one candidate target PScell/SCG in the candidate target SN using a first signaling procedure. In response to the candidate target PScell/SCG being successfully released, canceled, or deleted, the MN notifies the source SN via a second signaling procedure that the concerned candidate target PScell/SCG in the candidate target SN has been released, canceled, or deleted.

In some embodiments, a candidate target SN is involved in a conditional SN addition or change MR-DC procedure of a wireless communication device. The candidate target SN determines that a candidate target PScell/SCG in the candidate target SN needs to be released, canceled, or deleted. A MN and a source SN are currently configured to provide communication services to the wireless communication device. The candidate target SN requests to release, cancel, or delete the at least one candidate target PScell/SCG in the candidate target SN itself using a first signaling procedure. In response to the candidate target PScell/SCG being successfully released, canceled, or deleted, the MN notifies the source SN via a second signaling procedure that the concerned candidate target PScell/SCG in the candidate target SN has been released, canceled, or deleted.

In some embodiments, a source SN determines that a candidate target PScell/SCG in a candidate target SN needs to be released, canceled, or deleted. The candidate target SN is involved in a conditional SN addition or change MR-DC procedure of a wireless communication device. A MN and the source SN are currently configured to provide communication services to the wireless communication device. The source SN requests the MN to release, cancel, or delete the at least one candidate target PScell/SCG in the candidate target SN using a first signaling procedure. In response to the candidate target PScell/SCG being successfully released, canceled, or deleted, the MN notifies the source SN via a second signaling procedure that the concerned candidate target PScell/SCG in the candidate target SN has been released, canceled, or deleted.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 15A illustrates a block diagram of an example base station, in accordance with some embodiments of the present disclosure; and FIG. 15B illustrates a block diagram of an example UE, in accordance with some embodiments of the present disclosure.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
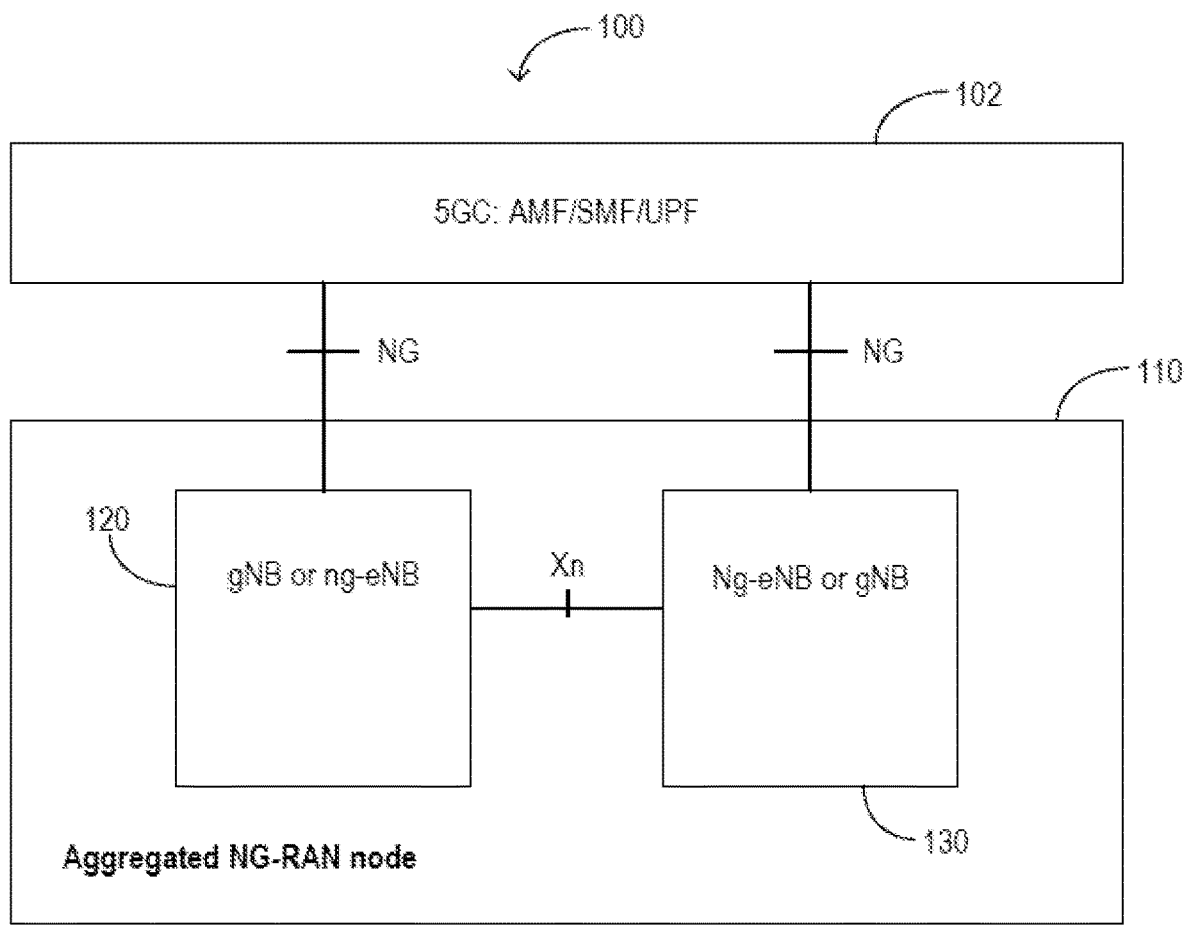
FIG. 1 is a block diagram illustrating an example communication system including an aggregated NG-RAN node, in accordance with some embodiments of the present disclosure.

FIG. 1 is a block diagram illustrating an example communication system 100 including an aggregated NG-RAN node 110, in accordance with some embodiments of the present disclosure. Referring to FIG. 1, the communication system 100 corresponds to a network architecture in which CU/DU air interface protocol stack is unseparated. As shown, the aggregated NG-RAN node 110 includes a first network node entity 120 and a second network node entity 130. Each of the network node entities 120 and 130 can be a gNB or a ng-eNB (unseparated).

Figure 2:
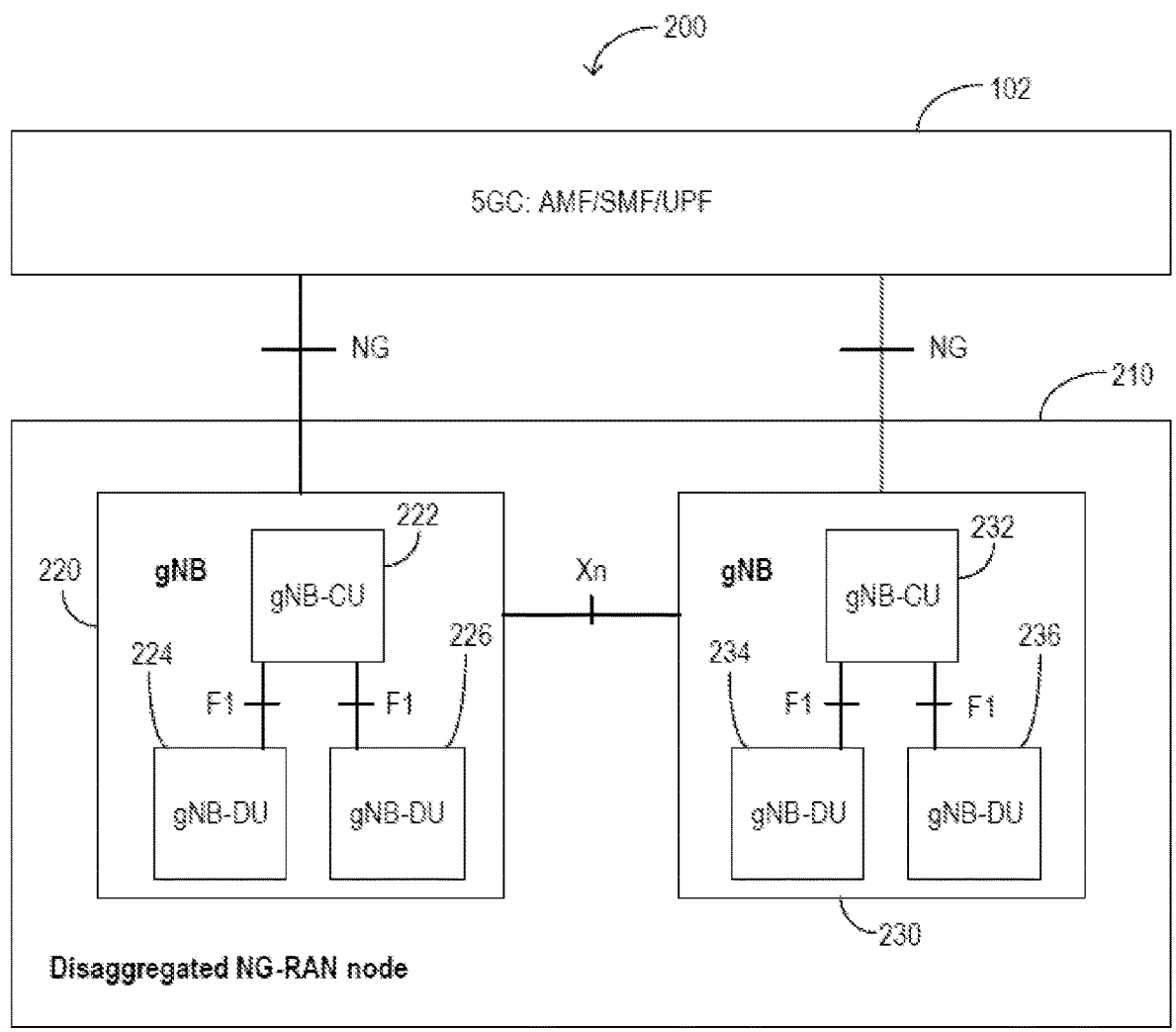
FIG. 2 is a block diagram illustrating an example communication system including a disaggregated NG-RAN node, in accordance with some embodiments of the present disclosure.

FIG. 2 is a block diagram illustrating an example communication system 200 including a disaggregated NG-RAN node 210, in accordance with some embodiments of the present disclosure. Referring to FIGS. 1-2, the communication system 200 corresponds to a network architecture in which gNB CU/DU air interface protocol stack is separated. As shown in the communication system 200, a single gNB 220 can be separated into network node entities including a single gNB-CU 222 and multiple gNB-DUs (e.g., gNB-DU 224 and 226). Likewise, the gNB 230 can be separated into network node entities including a single gNB-CU 232 and multiple gNB-DUs (e.g., gNB-DU 234 and 236). The gNB-CUs 222 and 232 can be bidirectionally connected to respective ones of the gNB-DUs 224, 226, 234, and 236 via standardized F1 interfaces, each of which includes F1-Control Plane (F1-C) connections and F1-User Plane (F1-U) connections.

In the communication systems 100 in which the gNB CU/DU air interface protocol stack is unseparated and in the communication systems 200 in which the gNB CU/DU air interface protocol stack is separated, the logical interfaces externally presented are NG and Xn interfaces. For example, the network node entities 120 and 130 are connected to each other via the Xn interface and connected to a 5GC 102 (including the AMF, SMF, UPF, and so on) via the NG interfaces. The gNBs 220 and 230 are connected to each other via the Xn interface and connected to the 5GC 102 via the NG interfaces.

The Control Plane (CP) connections of the network-side logical interfaces (e.g., NG, Xn, and F1) are used for transmitting control signaling messages between network entities/nodes. User Plane (UP) connections are used for transmitting user service data (packets). NG Application Protocol (NGAP), Xn Application Protocol (XnAP), and F1 Application Protocol (F1AP) are logical network application layer protocols for CP of NG-C, Xn-C, and F1-C Radio Network Layer (RNL), respectively. The NGAP, XnAP, and F1AP standardize signaling flow messages for each logical interface.

In some examples, the UE is only served by one serving base station (e.g., an eNB, an ng-eNB, or a gNB) at a given time, as in the case of a single-connection operation. In a single-connection operation, a current NG-RAN serving base station maintains the continuity of the terminal user communication service (session) using the handover (HO) procedure. IN the HO procedure, the communication context of the UE is smoothly migrated from a source serving node or cell to a target node or cell. The HO procedure typically includes three stages: an HO preparation stage, an HO execution stage, and an HO completion stage. In the HO preparation stage, the source serving base station, node, or cell (hereinafter referred to as the source node or the source cell) and the target serving base station, node, or cell (hereinafter referred to as the target node or the target cell) negotiate using the signaling flow of the network logical interface to determine the reservation configurations and air interface HO Command of the target-side communication resources. In the HO execution phase, the source node sends the air interface HO Command to the UE using the Radio Resource Control RRC) air interface signaling. The UE attempts to perform a HO operation for obtaining communication services from the designated target node. In the HO completion phase, the source node and the target node negotiate using suitable signaling procedures to notify the HO result and to release the communication resources that are no longer needed and the UE communication context from the source-side.

In a traditional unconditional or immediate HO procedure, the HO preparation stage and the HO execution stage are executed continuously in time. That is, the time interval between these two stages is minimal or non-existent. The source node initiates the HO preparation stage based on wireless Measurement Report and local Radio Resource Management (RRM) policy of the UE. Responsive to the designated target node (typically there is only one target primary node and one target primary serving cell in the traditional unconditional HO procedure) completing target-side resource reservation configuration related to the HO preparation stage, the source node immediately initiates HO execution. The UE then executes the HO command, attempting to switch to the target node. Therefore, the "actual HO moment" of the UE and receiving the air interface switching command occur continuously in time. The source node typically sends the air interface switching command to the UE in response to determining that the UE and the network-side satisfy actual switching conditions at the same time. Here, the actual switching conditions refer to the radio signal quality of the designated target node is sufficiently strong, and the reserved communication resource is sufficient and reasonably configured. After the UE successfully switches to the target node, at least part of the service continuity can be maintained.

The described traditional unconditional or immediate HO mechanism is originally designed for low-frequency band, sparse cell deployment. As the network capacity expands, heterogeneous networks (HetNets) are deployed over the homogeneous network. For example, a number of Small Cells are deployed within the coverage of the cellular macro cell. In the 5G system, aside from using low-frequency band resources, high-frequency band resources up to 100 GHz can be used. Such high-frequency cells can usually be deployed in the form of dense small cells referred to as Small Cell Clusters. In the 5G system, the CHO has been introduced. In the CHO process, a CHO handover preparation stage and a CHO handover execution stage are discontinuous in time, e.g., a large time interval exists between the CHO handover preparation stage and the CHO handover execution stage. The source node initiates the CHO preparation stage based on wireless Measurement Report and local RRM policy of the UE. In the CHO preparation stage, the source node requests multiple potential/candidate target base stations, cells, or nodes (referred to as potential/candidate target nodes/cells) to complete the CHO handover preparation process. For example, the candidate target nodes are requested to complete the target-side resource reservation configurations and to send the CHO pre-configuration or prepared information to the UE in advance through the air interface RRC signaling.

Then, the source node does not immediately initiate the CHO execution stage, and the UE does not immediately perform a CHO operation to a suitable target node. Instead, the UE stands by until the UE locally determines that actual HO conditions have been satisfied. In response to the UE determining that the actual HO conditions have been satisfied, the terminal UE performs a CHO operation to a suitable target node. Therefore, the actual HO moment of the UE and receiving the air interface CHO command are discontinuous in time. Through the CHO mechanism, the source node can perform reservation configuration for multiple target-side (cell) resources in advance when the source-side radio link status is still sufficient (e.g., when the UE is not at the edge of the source node cell). The UE selects the most suitable candidate target node according to local conditions that are dynamic. The target cell performs the HO, thus reducing the probability of HO failure and improving the user service experience.

Figure 3:
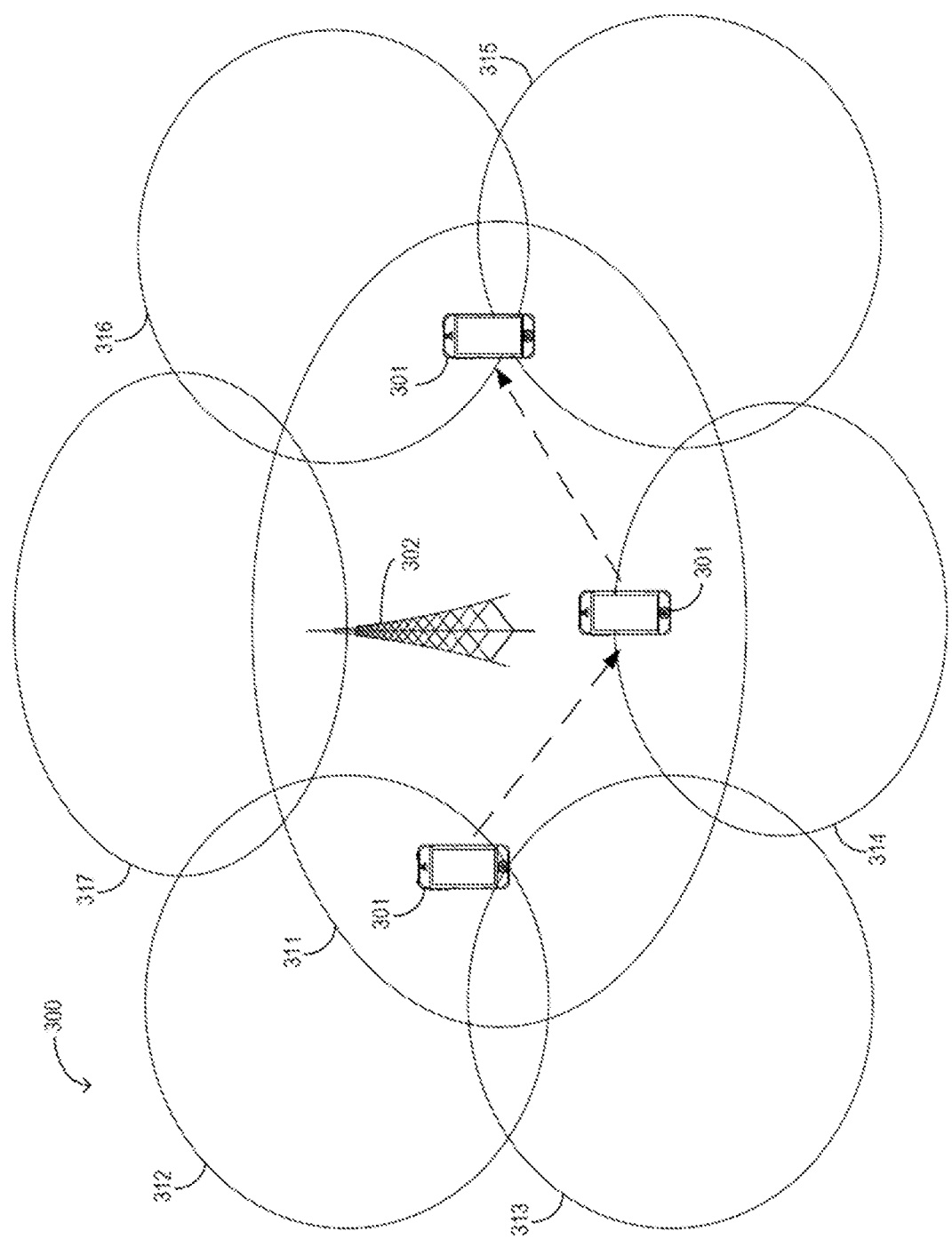
FIG. 3 illustrates a system that manages CHO preconfigured resources using a single base station, in accordance with some embodiments of the present disclosure.

FIG. 3 illustrates a system 300 that manages CHO pre-configured or prepared resources using a single base station (e.g., a source node 302), in accordance with some embodiments of the present disclosure. The system 300 does not involve inter-base station interfaces. As shown in FIG. 3, the source node 302 is a source base station providing wireless communication services in local cells 311-317. The cell 311 is the current primary serving cell for UE 301. As the UE 301 moves, the neighboring cells 312-317 may become potential/candidate target cells of the UE 301. In order to enhance mobile robustness and to improve user experience, the source node 302 can, through the CHO mechanism, preconfigure cells 312-317 as potential/candidate target cells of the UE 301. Responsive to the UE 301 locally determining that a target cell satisfies the actual HO conditions while the UE 301 is moving, the UE 301 performs the CHO on that target cell.

Figure 4:
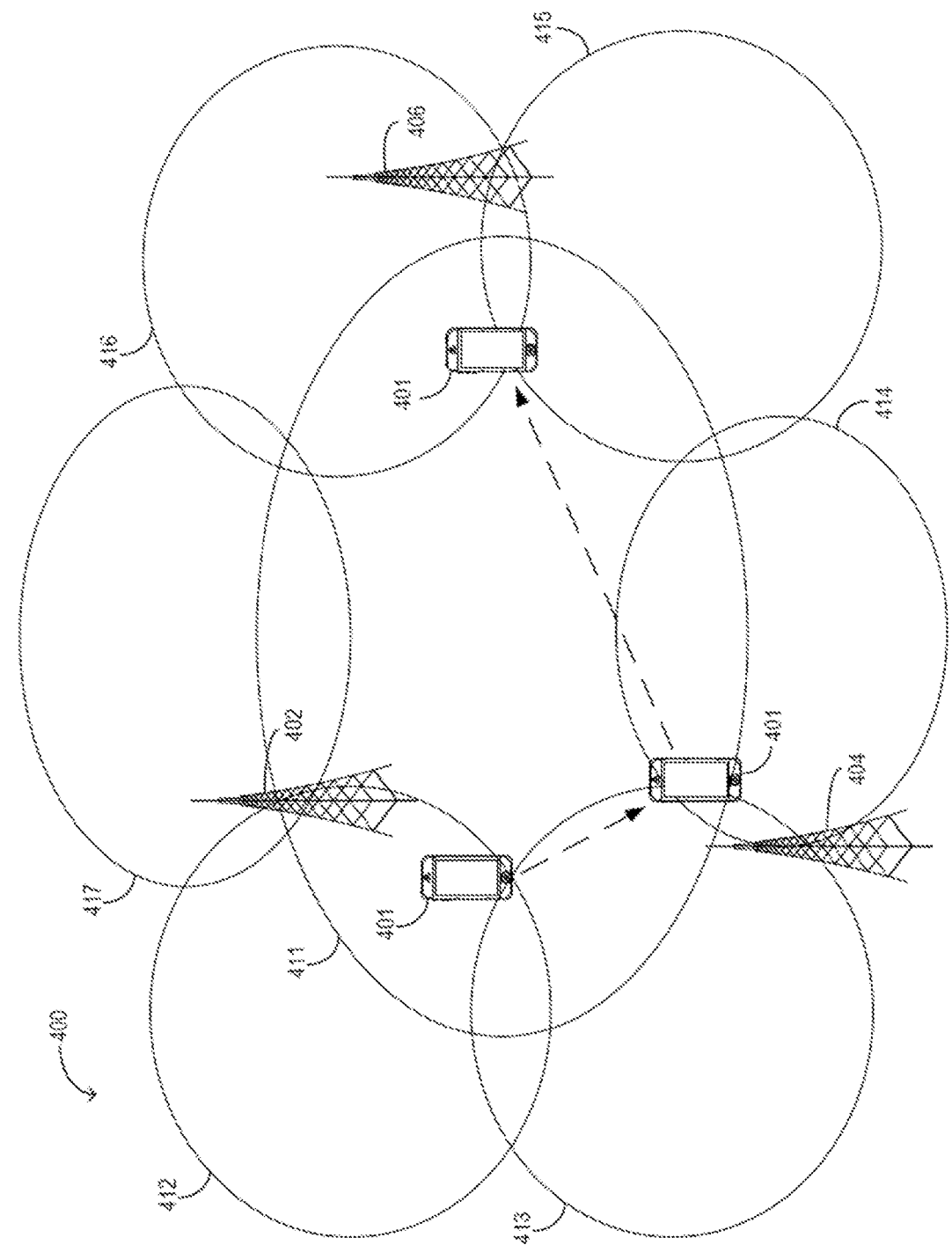
FIG. 4 illustrates a system that manages CHO preconfigured resources using a multiple base stations, in accordance with some embodiments of the present disclosure.

In the scenario in which the CHO involves different base stations or nodes, the source node needs to perform CHO pre-configuration or prepared negotiation and CHO preparation with a neighboring node using a suitable interface signaling procedure. FIG. 4 illustrates a system 400 that manages CHO preconfigured or prepared resources using a multiple base stations (e.g., nodes 402, 404, and 406), in accordance with some embodiments of the present disclosure. As shown in FIG. 4, the source node 402 administers communication services within local cells 411, 412, and 417. A neighboring base station 404 administers communication services within local cells 413 and 414. A neighboring base station 406 administers communication services within local cells 416 and 416. The cell 411 is the current primary serving cell of the UE 401. As the UE 401 moves, the cells 412-417 may also become a potential/candidate target cell of the UE 401. In order to enhance mobile robustness and to improve user experience, the source node 402 can preconfigure cells 413-416 as potential/candidate target cells of the UE 401 by negotiating the with the neighboring base stations 404 and 406 through the CHO mechanism.

With respect to the candidate target cells 413-416, in addition to a CHO Add (initial pre-configuration or prepared)" operation for each of the candidate target cells 413-416, CHO Modify (re-pre-configured) operation and CHO Release (cancel, delete pre-configuration or prepared) operation can also be performed. In some examples, the CHO Add and CHO Modify operations allow the CHO mechanism to function because a target node reserves configurations for the communication resources for the UE 401. The CHO release (or CHO cancellation) operation significantly affects the efficiency of the CHO mechanism and the occupation of system resources given that when a preconfigured or prepared candidate target cell is no longer suitable, a base station should release or cancel such a candidate target cell as soon as possible in time. The UE no longer locally evaluates whether that candidate target cell satisfies the actual HO conditions and is no longer ready to perform CHO with respect to that candidate target cell. In some examples, the candidate target cell is no longer suitable if the UE has gradually moved away from the candidate target cell such that subsequent access is unlikely, or if the candidate target cell is suffering from load congestion.

Figure 5:
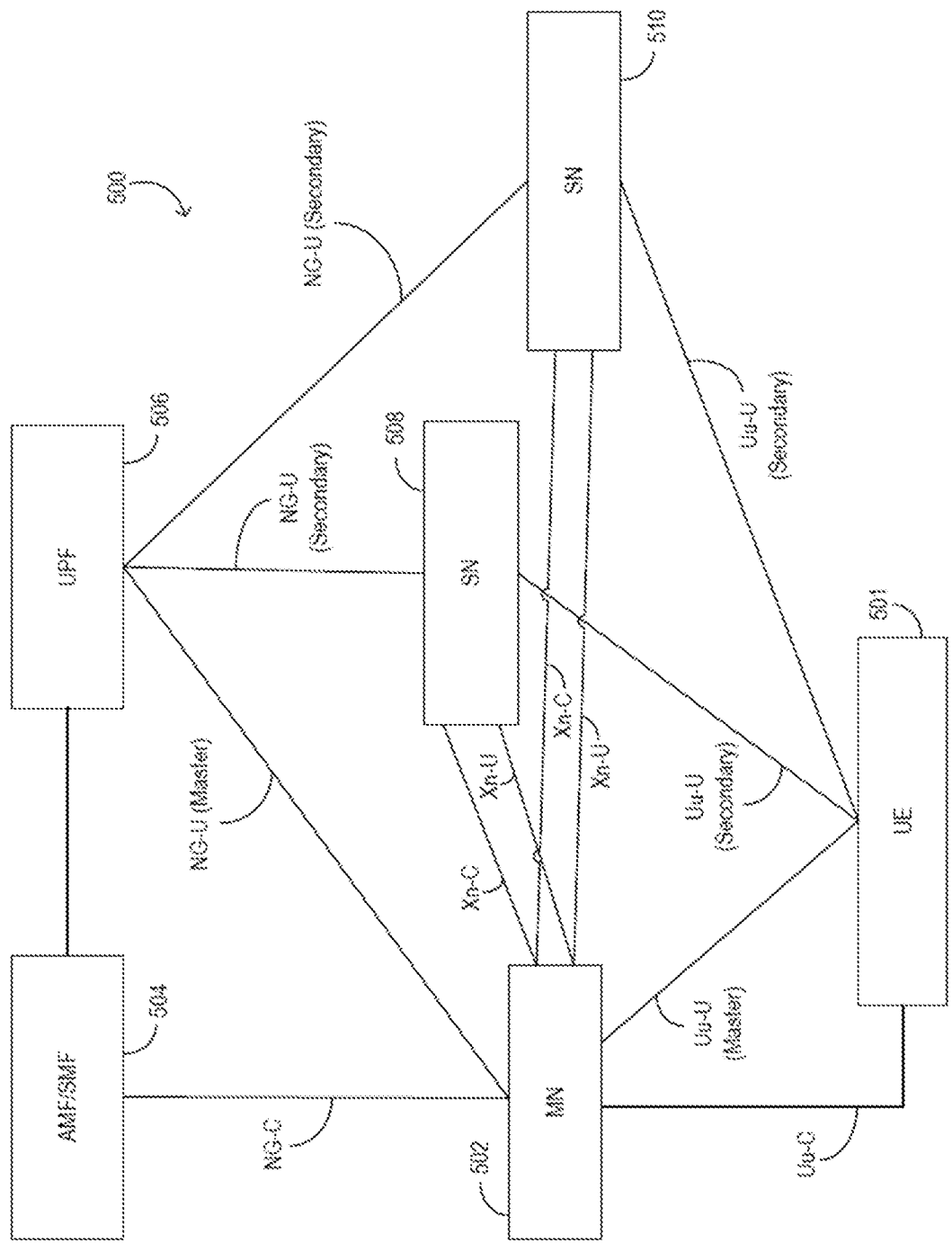
FIG. 5 illustrates a system capable of performing NG-RAN multi-connectivity operations, in accordance with some embodiments of the present disclosure.

FIG. 5 illustrates a system 500 capable of performing NG-RAN multi-connectivity operations, in accordance with some embodiments of the present disclosure. Referring to FIG. 5, under network and terminal multi-connectivity operation, a UE 501 can be served by two or more serving base stations at the same time. As shown in FIG. 5, the UE 501 can be simultaneously and uniquely connected to a MN 502 and two SNs 508 and 510.

The MN 502 is a primary anchor base station that determines the RRC state of the UE 501. The MN 502 has an NG-C connection with the 5GC (e.g., AMF/SMF 504, which is connected to UPF 506). The MN 502 also has a master NG-U connection with the UPF 506. The SNs 508 and 510 data offloads the MN 502 and are controlled by the MN 502. Each of the SN 508 and 510 is connected to the MN 502 via a Xn-C connection and a Xn-U connection. Each of the SNs 508 and 510 is connected to the 5GC (e.g., the UPF 506) via a second NG-U connection. The UE 501 can establish a master Uu-User Plane (Uu-U) radio link (RL) and a Uu-Control Plane (Uu-C) RL with the MN 502 and a secondary Uu-U RL with reach of the SNs 508 and 510 for transmitting uplink and downlink user service data simultaneously.

In the 5G NG-RAN system, each of the MN 502 and SNs 508 and 510 can be a gNB or a ng-eNB. Each of the MN 502 and SNs 508 and 510 independently allocates and schedules radio resources for providing wireless communication services to the UE 501. As the UE 501 moves, a change of the MN may occur, for example, if the UE 501 moves from the coverage of the source MN to the coverage of a target MN. At this time, the traditional HO or CHO mobility procedure flow for the single-connection operation as described herein can be executed. Mobility management of the serving cell on the MN side can be performed.

Figure 6:
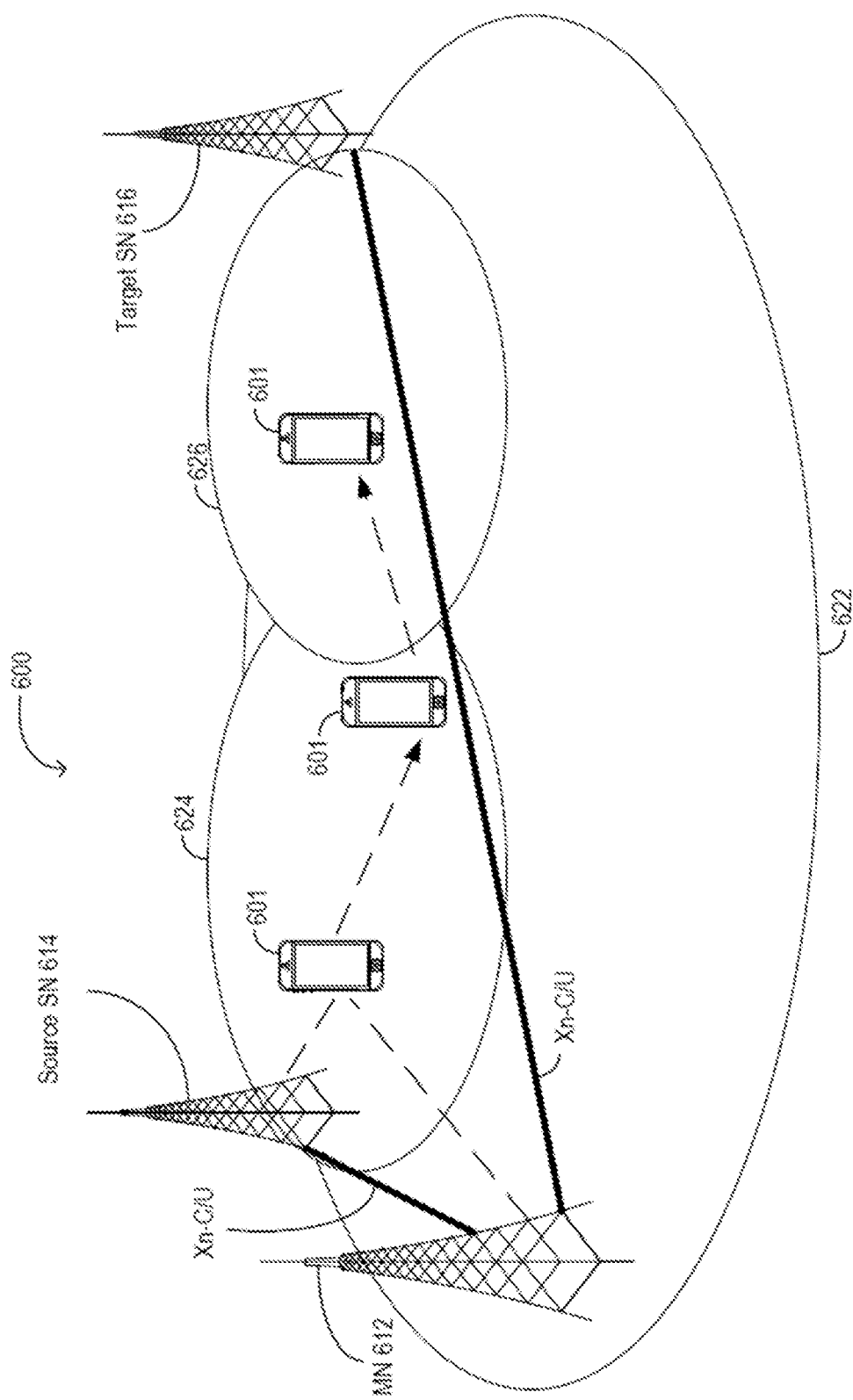
FIG. 6 illustrates a system supporting multi-connectivity operation of a UE, in accordance with some embodiments of the present disclosure.

In addition, the multi-connectivity operation has a unique mobility scenario—as the UE moves, the MN connected to the UE remains unchanged, and the SN changes. That is, the UE is within the coverage of the same MN while moving away from the coverage of the source SN to the coverage of a target SN. In that regard, FIG. 6 illustrates a system 600 supporting multi-connectivity operation of a UE 601, in accordance with some embodiments of the present disclosure. Referring to FIG. 6 illustrates a mobile scenario in which a SN is changed. The system 600 involving a MN 612, a source SN 614, and a target SN 616. As shown in FIG. 6, a UE 601 is originally in multi-connectivity operation (e.g., MR-DC operation) in the joint coverage of the MN 612 and the source SN 614. The MN 612 and the source SN 614 are currently configured to provide communication services to the UE 601. As the UE 601 moves toward the target SN 616, the UE 601 enters the joint coverage of the anchor MN 612 and the target SN 616. In this case, to manage mobility of the UE 601, the SN can be changed using the traditional SN change mobility flow in multi-connectivity operation, or the SN can be changed using conditional SN change mobility flow.

While the UE 601 is already in the multi-connectivity operation, the currently serving MN 612 and the source SN 614 can preconfigure the candidate conditional target SN on the secondary-SN side, and perform related addition, modification, and release management. In this case, the UE 601 does not immediately access the candidate CHO PScell/SCG on the SN side and stands by until the UE 601 locally determines that the actual conditions are satisfied before accessing the PScell/SCG. A wireless communication link is established after the UE 601 access the PScell/SCG of the target SN. Similarly, the candidate conditional target SN facing the SN side also performs the SN-side CHO addition (e.g., initial pre-configuration or prepared) operation associated with each candidate CHO PScell/SCG, the SN-side CHO modification (e.g., re-provisioning) operation, and SN-side CHO release (e.g., preconfiguring cancelation, deletion, and so on).

Some aspects of the present disclosure relate to improvements to the release, cancelation and deletion of the candidate target SN on the SN side that can effectively reduce the long-term reservation or occupation of related communication resources, thus realizing timely recovery and reuse of such communication resources. Some described features provide a method for releasing, canceling, and deleting a SN-side candidate condition target cell (candidate CHO PScell/SCG) resources in multi-connectivity operation.

The disclosed features can be implemented in or applicable to a scenario or environment in which all of the UE, the primary base station, and the secondary base stations support multi-connectivity conditional SN change mobile scenario and related flow. Due to mobility features, the UE can move across coverages of different secondary base stations. At any given time, at least one source secondary base station (e.g., a source SN) and at least one candidate target base station (e.g., a candidate target SN or target SN) exist simultaneously. The UE is currently operating in a multi-connectivity mode, meaning that a master base station (e.g., a MN) and a source secondary base station (e.g., a source SN) are currently providing wireless communication services to the UE. For the sake of clarity, although described with respect to dual-connectivity operations, the methods and systems of the present disclosure can be implemented in any multi-connectivity operations.

Figure 7:
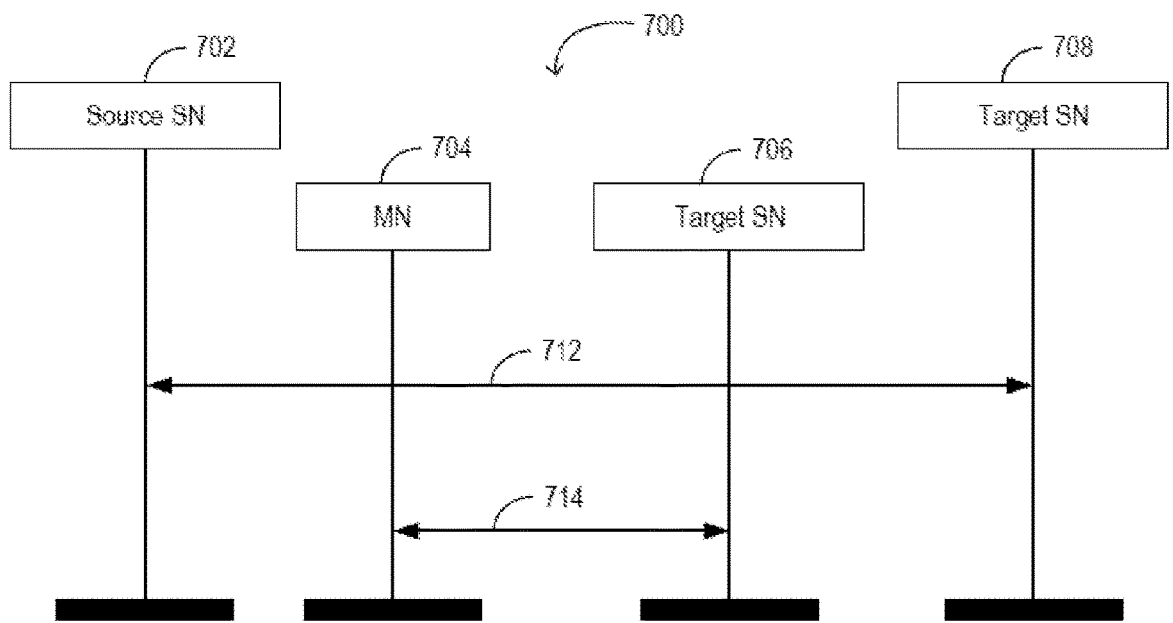
FIG. 7 is a signal diagram illustrating a method for performing a conditional SN change, in accordance with some embodiments of the present disclosure.

FIG. 7 is a signal diagram illustrating a method 700 for performing a conditional SN change, in accordance with some embodiments of the present disclosure. Referring to FIGS. 1-7, the UE (not shown) is currently in dual-connectivity operation in which a MN 704 and a source SN 702 are simultaneously serving the UE by providing wireless communication services thereto. In that regard, the UE is connected to both the MN 704 and the SN 702 simultaneously. The UE reports, to the MN 704 and the source SN 702, relevant RRM measurements as the UE moves. Based on such RRM measurements, the MN 704 elects and conditionally preconfigures one or more candidate target SNs (including a first target SN 706, at 712) for the conditional SN change for the UE. On the other hand, based on such RRM measurements, the source SN 702 selects and conditionally preconfigures one or more candidate target SNs (including a second target SN 708, at 714) for the conditional SN change for the UE.

As used herein, conditionally preconfiguring a candidate target SN (e.g., the target SNs 706 and 708) refers to providing or preconfiguring conditions used for determining mobility operations for the UE, such that in response to the UE determining that such preconfigured or prepared conditions are satisfied, the UE performs mobility operations with respect to the candidate target SN (e.g., to connect to the candidate target SN). For example, the UE subsequently evaluates "actual conditions" locally to determine whether the preconfigured or prepared conditions are satisfied. Responsive to determining that a target SN (of the candidate target SNs selected and preconfigured or prepared by the MN 704 and the candidate target SNs selected and preconfigured or prepared by the source SN 702) satisfies the preconfigured or prepared conditions, the UE attempts to access candidate target PScell/SCG (and resources thereof) of that target SN.

Accordingly, the disclosed features apply mechanisms and principles of CHO to multi-connectivity conditional SN change and MR-DC scenarios. Through the use of signaling procedures such as but not limited to, the SN Release signaling flow, the Conditional PScell Cancel signaling flow, and so on, the cancelation or deletion of the communication resources of the candidate target secondary base station cell (group) can be realized in a flexible and efficient manner, thus effectively reducing long-term reservation and occupation of the communication resources and providing timely recovery and reuse of the communication resources.

Figure 8:
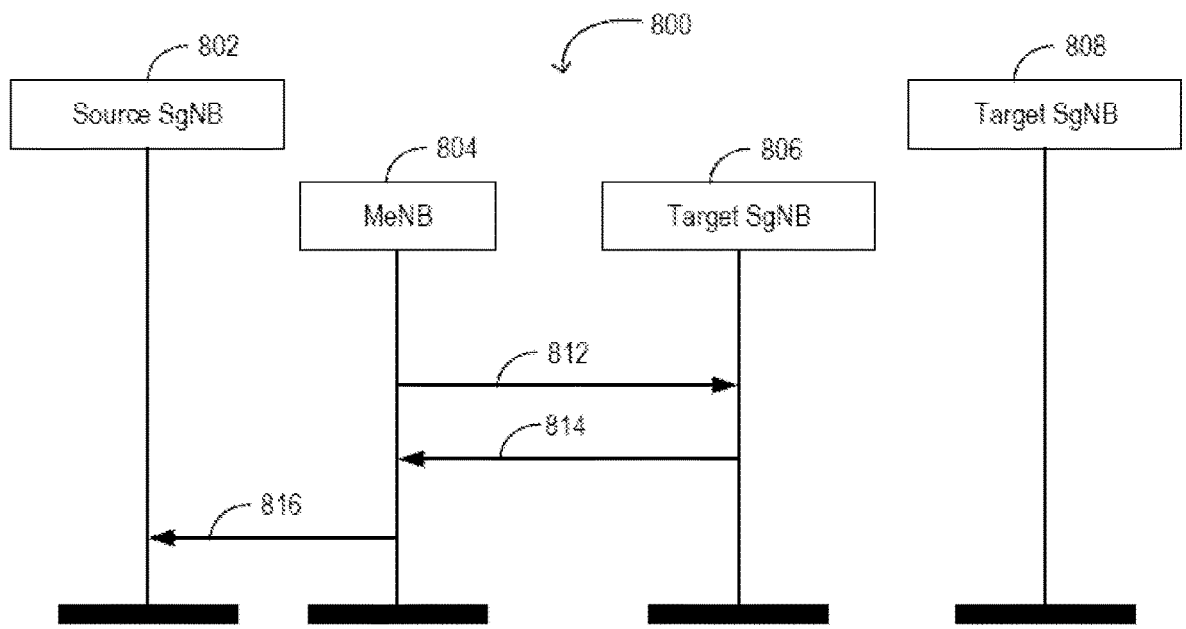
FIG. 8 is a signal diagram illustrating a method for performing a conditional SN change, in accordance with some embodiments of the present disclosure.

FIG. 8 is a signal diagram illustrating a method 800 for performing a conditional SN change, in accordance with some embodiments of the present disclosure. Referring to FIGS. 6-8, the method 800 involves a source secondary gNB (SgNB) 802, a master eNB (MeNB) 804, a first target SgNB 806, and a second target SgNB 808. The MeNB 804 corresponds to a MN. The source SgNB 802 corresponds to source SN. The target SgNBs 806 and 808 correspond to candidate target SNs.

A UE (not shown) is currently in a dual-connectivity operation (e.g., E-UTRA-NR Dual Connectivity (EN-DC) operation). That is, the MeNB 804 and the source SgNB 802 are currently configured to provide communication services for the UE. The MeNB 804 selects and conditionally preconfigures two candidate target secondary base stations (e.g., the target SgNBs 806 and 808) according to the UE mobility and RRM measurement report received from the UE. The first target SgNB 806 includes first candidate target secondary cell (group) PScell/SCG (referred to herein as PScell1/SCG1). The second target SgNB 808 includes second candidate target secondary cell (group) PScell/SCG (referred to herein as PScell2/SCG2).

As the UE gradually moves away from the first target SgNB 806, the first target SgNB 806 being the actual secondary base station for the UE becomes increasingly unlikely. In response to the MeNB 804 determining that the first target SgNB 806 cannot be the actual SN for the UE, the MeNB 804 timely releases, cancels, or deletes the communication resources of the first target SgNB 806 and timely recycles the communication resources. The MeNB 804 has established UE-associated signaling connections with the source SgNB 802, the first target SgNB 806, and the second target SgNB 808 to carry or otherwise communicate UE-specific signaling in the manner described herein.

For example, at 812, the MeNB 804 sends to the first target SgNB 806, a request message requesting the first target SgNB 806 to release, cancel, or delete indication information and Cause of the conditionally preconfigured or prepared PScell1/SCG1. In some implementations, the message is an X2AP:SgNB Release Request UE-associated message. In response to determining that PScell1/SCG1 is uniquely associated with the MeNB UE X2AP ID and the SgNB UE X2AP ID associated with the UE-specific message, an identifier of the PScell1/SCG1 is not needed. On the other hand, in response to determining that PScell1/SCG1 cannot be uniquely associated with the MeNB UE X2AP ID or the SgNB UE X2AP ID associated with the UE-specific message, the PScell1/SCG1 identifier needs to be included to identify PScell1/SCG1.

Responsive to the request received at 812, the first target SgNB 806 releases, cancels, or deletes PScell1/SCG1 and communication resources associated therewith. At 814, the target SgNB 806 replies to the request received at 812 by sending a request acknowledge message (e.g., a X2AP: SgNB Release Request Acknowledge UE-associated message) to the MeNB 804.

At 816, the MeNB 804 sends a cancel message to the source SgNB 802, informing the source SgNB 802 that the preconfigured or prepared PScell1/SCG1 and communication resources associated therewith have been successfully released, canceled, or deleted. In some examples, the cancel message is X2AP: Conditional PScell Cancel UE-associated message. Responsive to receiving the cancel message at 816, the source SgNB 802 refrains from conditionally preconfiguring PScell1/SCG1 within a predefined time interval.

Figure 9:
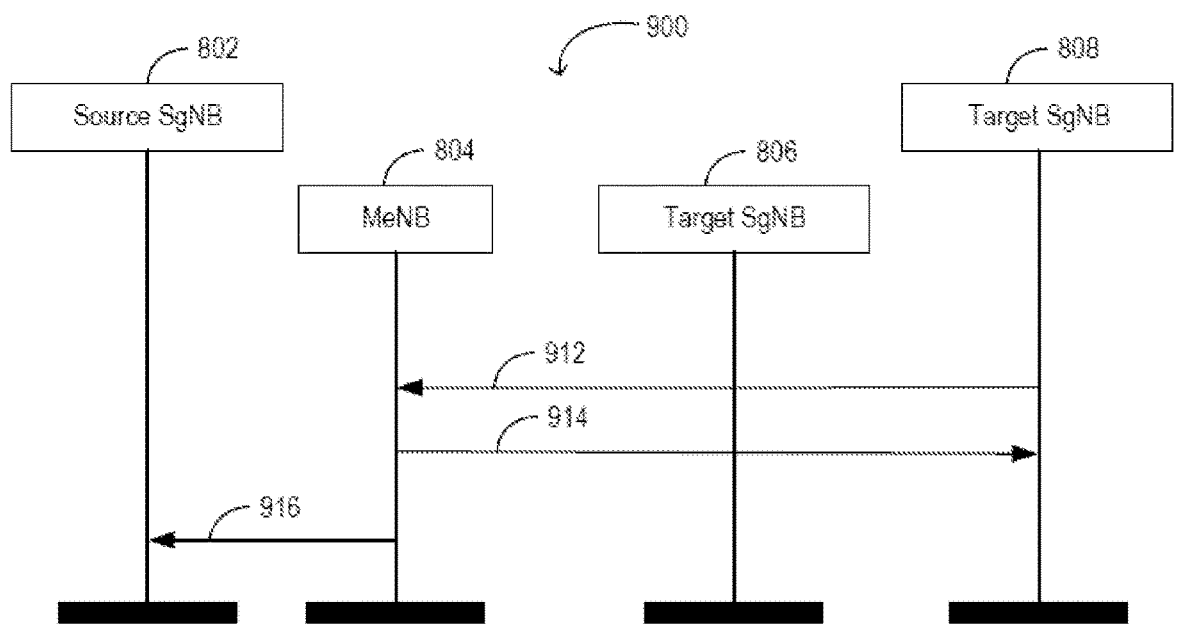
FIG. 9 is a signal diagram illustrating a method for performing a conditional SN change, in accordance with some embodiments of the present disclosure.

FIG. 9 is a signal diagram illustrating a method 900 for performing a conditional SN change, in accordance with some embodiments of the present disclosure. Referring to FIGS. 6-9, the method 900 involves the source SgNB 802, the MeNB 804, the first target SgNB 806, and the second target SgNB 808. A UE (not shown) is currently in a dual-connectivity operation (e.g., EN-DC operation). That is, the MeNB 804 and the source SgNB 802 are currently configured to provide communication services for the UE. The MeNB 804 selects and conditionally preconfigures the first target SgNB 806 according to the UE mobility and RRM measurement report received from the UE. The first target SgNB 806 includes PScell1/SCG1. The SgNB 802 selects and conditionally preconfigures the second target SgNB 808 according to the UE mobility and RRM measurement report received from the UE. The second target SgNB 808 includes PScell2/SCG2.

As the second target SgNB 808 locally experiences load congestion of its communication resources or policy adjustment, the second target SgNB 808 can no longer be a candidate target SN for the UE. In response to the second target SgNB 808 determining that the second target SgNB 808 itself cannot be the candidate target SN for the UE, the second target SgNB 808 timely releases, cancels, or deletes the communication resources of the second target SgNB 808 itself, and timely recycles the communication resources. The MeNB 804 has established UE-associated signaling connections with the source SgNB 802, the first target SgNB 806, and the second target SgNB 808 to carry or otherwise communicate UE-specific signaling in the manner described herein.

For example, at 912, the second target SgNB 808 sends to the MeNB 804, a request message containing indication information of and Cause for the second target SgNB 808 releasing, canceling, or deleting of the conditionally preconfigured or prepared PScell2/SCG2. In some implementations, the request message is an X2AP:SgNB Release Required UE-associated message. In response to determining that PScell2/SCG2 is uniquely associated with the MeNB UE X2AP ID and the SgNB UE X2AP ID associated with the UE-specific message, an identifier of the PScell2/

SCG2 is not needed. On the other hand, in response to determining that PScell2/SCG2 cannot be uniquely associated with the MeNB UE X2AP ID or the SgNB UE X2AP ID associated with the UE-specific message, the PScell2/SCG2 identifier needs to be included to identify PScell2/SCG2.

Responsive to the request message received at 912, the MeNB 804 confirms the releasing, canceling, or deleting of the conditionally preconfigured or prepared PScell2/SCG2 and communication resources associated therewith by sending a release confirm message to the second target SgNB 808, at 914. In some examples, the release confirm message is a X2AP: SgNB Release Confirm UE-associated message.

At 916, the MeNB 804 sends a cancel message to the source SgNB 802, informing the source SgNB 802 that the preconfigured or prepared PScell2/SCG2 and communication resources associated therewith have been successfully released, canceled, or deleted. In some examples, the cancel message is X2AP: Conditional PScell Cancel UE-associated message. Responsive to receiving the cancel message at 916, the source SgNB 802 refrains from conditionally preconfiguring PScell2/SCG2 within a predefined time interval.

Figure 10:
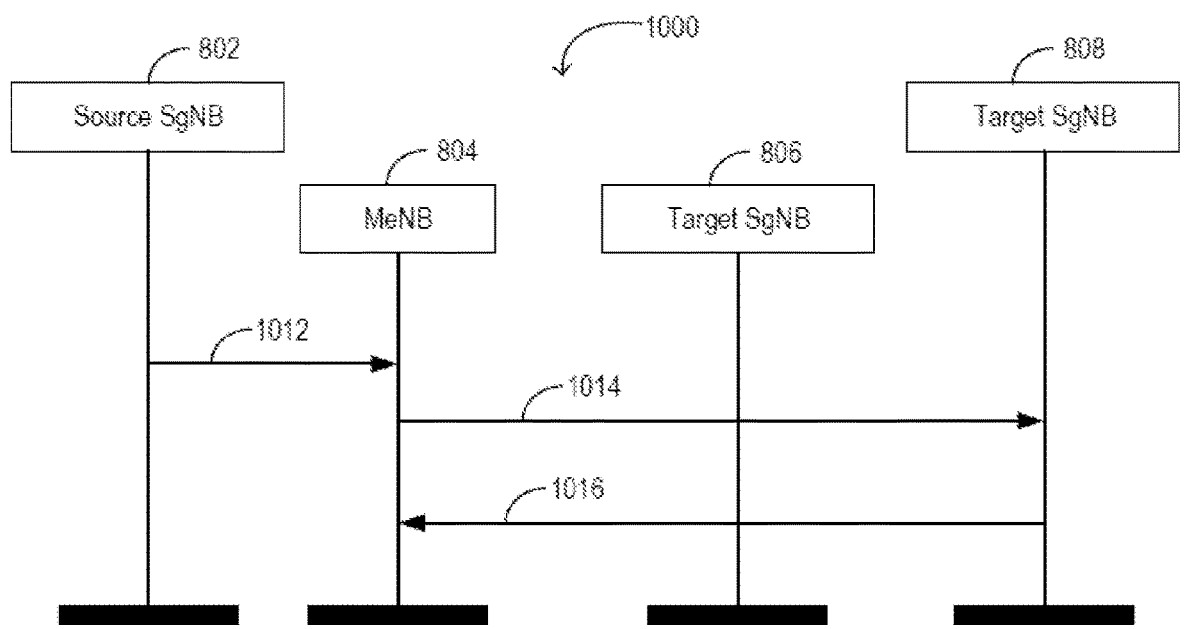
FIG. 10 is a signal diagram illustrating a method for performing a conditional SN change, in accordance with some embodiments of the present disclosure.

FIG. 10 is a signal diagram illustrating a method 1000 for performing a conditional SN change, in accordance with some embodiments of the present disclosure. Referring to FIGS. 6-10, the method 1000 involves the source SgNB 802, the MeNB 804, the first target SgNB 806, and the second target SgNB 808. A UE (not shown) is currently in a dual-connectivity operation (e.g., EN-DC operation). That is, the MeNB 804 and the source SgNB 802 are currently configured to provide communication services for the UE. The MeNB 804 selects and conditionally preconfigures the first target SgNB 806 according to the UE mobility and RRM measurement report received from the UE. The first target SgNB 806 includes PScell1/SCG1. The source SgNB 802 selects and conditionally preconfigures the second target SgNB 808 according to the UE mobility and RRM measurement report received from the UE. The second target SgNB 808 includes PScell2/SCG2.

As the source SgNB 802 locally experiences policy adjustment, the source SgNB 802 determines to cancel the second target SgNB 808 and communication resources associated therewith, where the second target SgNB 808 had been selected and conditionally preconfigured or prepared by the source SgNB 802. In response to the source SgNB 802 determining that the second target SgNB 808 cannot be the candidate target SN for the UE, the source SgNB 802 timely releases, cancels, or deletes the communication resources of the second target SgNB 808, and timely recycles the communication resources. The MeNB 804 has established UE-associated signaling connections with the source SgNB 802, the first target SgNB 806, and the second target SgNB 808 to carry or otherwise communicate UE-specific signaling in the manner described herein.

For example, at 1012, the source SgNB 802 sends to the MeNB 804, a request message requesting the MeNB 804 to release, cancel, or delete the conditionally preconfigured or prepared PScell2/SCG2 and communication resources associated therewith. In some implementations, the request message is an X2AP: Conditional PScell Cancel UE-associated message. In response to determining that PScell2/SCG2 is uniquely associated with the MeNB UE X2AP ID and the SgNB UE X2AP ID associated with the UE-specific message, an identifier of the PScell2/SCG2 is not needed. On the other hand, in response to determining that PScell2/SCG2 cannot be uniquely associated with the MeNB UE X2AP ID or the SgNB UE X2AP ID associated with the UE-specific message, the PScell2/SCG2 identifier needs to be included to identify PScell2/SCG2.

Responsive to the request message received at 1012, the MeNB 804 sends to the second target SgNB 808, a request message requesting the second target SgNB 808 to release, cancel, or delete indication information and Cause of the conditionally preconfigured or prepared PScell2/SCG2, at 1014. In some implementations, the request message is an X2AP:SgNB Release Request UE-associated message. In response to determining that PScell2/SCG2 is uniquely associated with the MeNB UE X2AP ID and the SgNB UE X2AP ID associated with the UE-specific message, an identifier of the PScell2/SCG2 is not needed. On the other hand, in response to determining that PScell2/SCG2 cannot be uniquely associated with the MeNB UE X2AP ID or the SgNB UE X2AP ID associated with the UE-specific message, the PScell2/SCG2 identifier needs to be included to identify PScell2/SCG2.

Responsive to the request received at 1014, the second target SgNB 808 releases, cancels, or deletes PScell2/SCG2 and communication resources associated therewith. At 1016, the second target SgNB 808 replies to the request received at 1014 by sending a request acknowledge message (e.g., a X2AP:SgNB Release Request Acknowledge UE-associated message) to the MeNB 804. Responsive to receiving the cancel message at 1016, the source SgNB 802 refrains from conditionally preconfiguring PScell2/SCG2 within a predefined time interval.

Figure 11:
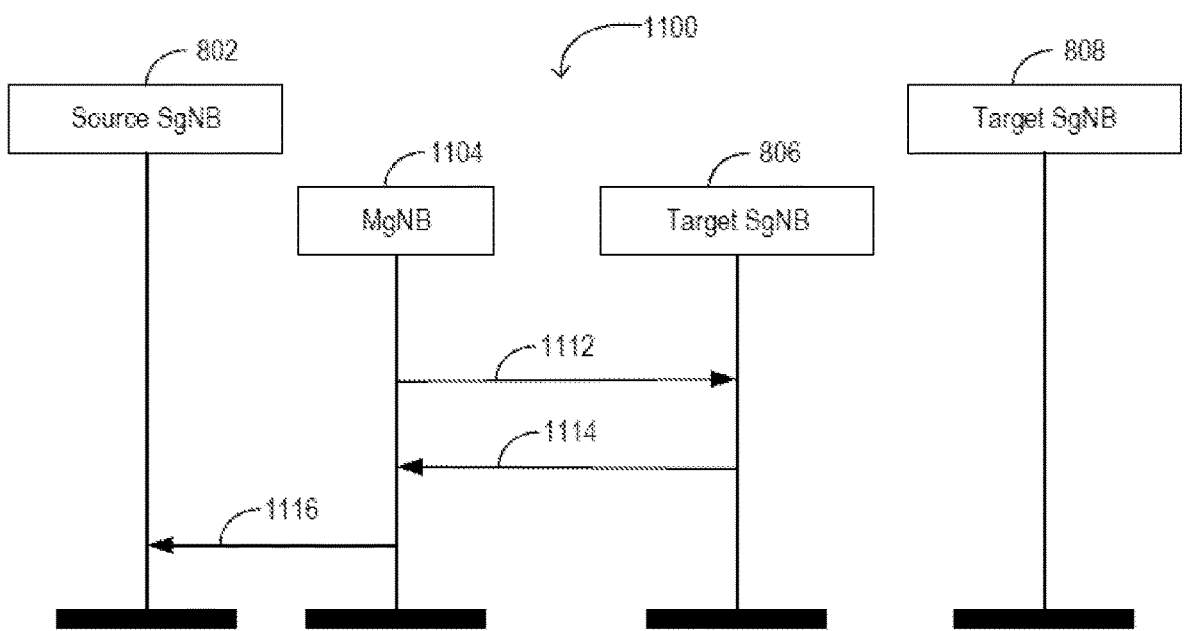
FIG. 11 is a signal diagram illustrating a method for performing a conditional SN change, in accordance with some embodiments of the present disclosure.

FIG. 11 is a signal diagram illustrating a method 1100 for performing a conditional SN change, in accordance with some embodiments of the present disclosure. Referring to FIGS. 6-11, the method 1100 involves the source SgNB 802, a master gNB (MgNB) 1104, the first target SgNB 806, and the second target SgNB 808. The MgNB 1104 corresponds to a MN.

A UE (not shown) is currently in a dual-connectivity operation (e.g., Intra-NR Dual Connectivity (NR-DC) @5GC operation). That is, the MgNB 1104 and the source SgNB 802 are currently configured to provide communication services for the UE. The MgNB 1104 selects and conditionally preconfigures two candidate target secondary base stations (e.g., the target SgNBs 806 and 808) according to the UE mobility and RRM measurement report received from the UE. The first target SgNB 806 includes PScell1/SCG1. The second target SgNB 808 includes PScell2/SCG2.

As the UE gradually moves away from the first target SgNB 806, the first target SgNB 806 being the actual SN for the UE becomes increasingly unlikely. In response to the MgNB 1104 determining that the first target SgNB 806 cannot be the actual SN for the UE, the MgNB 1104 timely releases, cancels, or deletes the communication resources of the first target SgNB 806 and timely recycles the communication resources. The MgNB 1104 has established UE-associated signaling connections with the source SgNB 802, the first target SgNB 806, and the second target SgNB 808 to carry or otherwise communicate UE-specific signaling in the manner described herein.

For example, at 1112, the MgNB 1104 sends to the first target SgNB 806, a request message requesting the first target SgNB 806 to release, cancel, or delete indication information and Cause of the conditionally preconfigured or prepared PScell1/SCG1. In some implementations, the request message is an XnAP:S-Node Release Request UE-associated message. In response to determining that PScell1/SCG1 is uniquely associated with the M-NG-RAN node UE XnAP ID and the S-NG-RAN node UE XnAP ID associated with the UE-specific message, an identifier of the PScell1/ SCG1 is not needed. On the other hand, in response to determining that PScell1/SCG1 cannot be uniquely associated with the M-NG-RAN node UE XnAP ID or the S-NG-RAN node UE XnAP ID associated with the UE-specific message, the PScell1/SCG1 identifier needs to be included to identify PScell1/SCG1.

Responsive to the request received at 1112, the first target SgNB 806 releases, cancels, or deletes PScell1/SCG1 and communication resources associated therewith. At 1114, the target SgNB 806 replies to the request received at 1112 by sending a request acknowledge message (e.g., a XnAP:S-Node Release Request Acknowledge UE-associated message) to the MgNB 1104.

At 1116, the MgNB 1104 sends a cancel message to the source SgNB 802, informing the source SgNB 802 that the preconfigured or prepared PScell1/SCG1 and communication resources associated therewith have been successfully released, canceled, or deleted. In some examples, the cancel message is XnAP: Conditional PScell Cancel UE-associated message. Responsive to receiving the cancel message at 1116, the source SgNB 802 refrains from conditionally preconfiguring PScell1/SCG1 within a predefined time interval.

Figure 12:
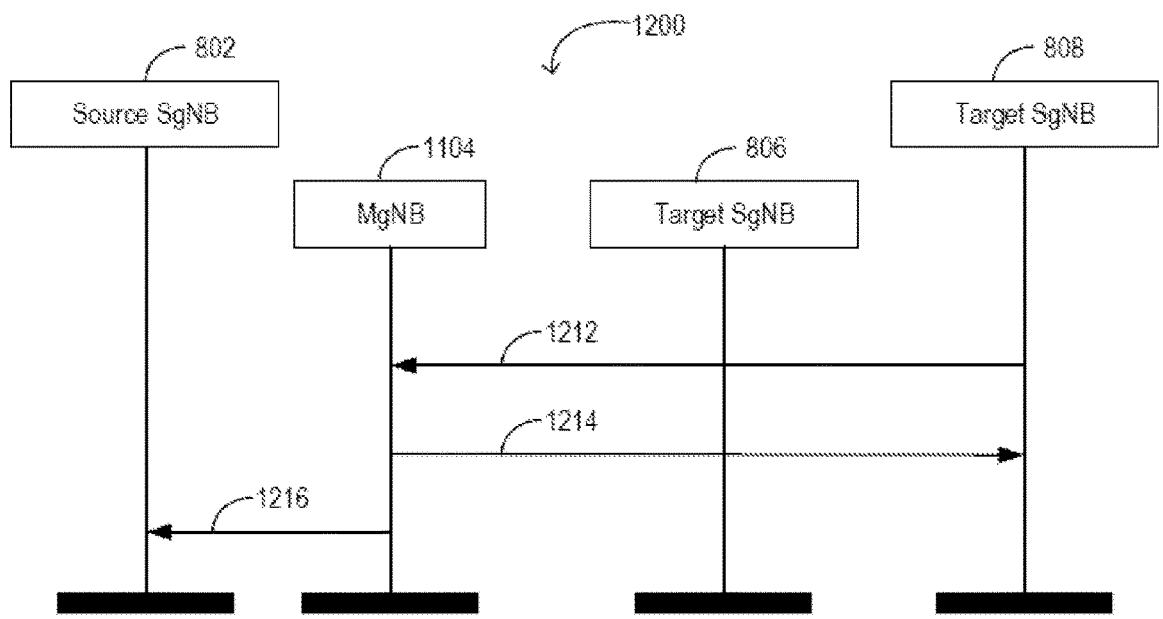
FIG. 12 is a signal diagram illustrating a method for performing a conditional SN change, in accordance with some embodiments of the present disclosure.

FIG. 12 is a signal diagram illustrating a method 1200 for performing a conditional SN change, in accordance with some embodiments of the present disclosure. Referring to FIGS. 6-12, the method 1200 involves the source SgNB 802, the MgNB 1104, the first target SgNB 806, and the second target SgNB 808. A UE (not shown) is currently in a dual-connectivity operation (e.g., NR-DC@5GC operation operation). That is, the MgNB 1104 and the source SgNB 802 are currently configured to provide communication services for the UE. The MgNB 1104 selects and conditionally preconfigures the first target SgNB 806 according to the UE mobility and RRM measurement report received from the UE. The first target SgNB 806 includes PScell1/SCG1. The SgNB 802 selects and conditionally preconfigures the second target SgNB 808 according to the UE mobility and RRM measurement report received from the UE. The second target SgNB 808 includes PScell2/SCG2.

As the second target SgNB 808 locally experiences load congestion of its communication resources or policy adjustment, the second target SgNB 808 can no longer be a candidate target SN for the UE. In response to the second target SgNB 808 determining that the second target SgNB 808 itself cannot be the candidate target SN for the UE, the second target SgNB 808 timely releases, cancels, or deletes the communication resources of the second target SgNB 808 itself, and timely recycles the communication resources. The MgNB 1104 has established UE-associated signaling connections with the source SgNB 802, the first target SgNB 806, and the second target SgNB 808 to carry or otherwise communicate UE-specific signaling in the manner described herein.

For example, at 1212, the second target SgNB 808 sends to the MgNB 1104, a request message containing indication information of and Cause for the second target SgNB 808 releasing, canceling, or deleting of the conditionally preconfigured or prepared PScell2/SCG2. In some implementations, the request message is an XnAP:S-Node Release Required UE-associated message. In response to determining that PScell2/SCG2 is uniquely associated with the M-NG-RAN node UE XnAP ID and the S-NG-RAN node UE XnAP ID associated with the UE-specific message, an identifier of the PScell2/SCG2 is not needed. On the other hand, in response to determining that PScell2/SCG2 cannot be uniquely associated with the M-NG-RAN node UE XnAP ID or the S-NG-RAN node UE XnAP ID associated with the UE-specific message, the PScell2/SCG2 identifier needs to be included to identify PScell2/SCG2.

Responsive to the request message received at 1212, the MgNB 1104 confirms the releasing, canceling, or deleting of the conditionally preconfigured or prepared PScell2/SCG2 and communication resources associated therewith by sending a release confirm message to the second target SgNB 808, at 1214. In some examples, the release confirm message is a XnAP:S-Node Release Confirm UE-associated message.

At 1216, the MgNB 1104 sends a cancel message to the source SgNB 802, informing the source SgNB 802 that the preconfigured or prepared PScell2/SCG2 and communication resources associated therewith have been successfully released, canceled, or deleted. In some examples, the cancel message is XnAP: Conditional PScell Cancel UE-associated message. Responsive to receiving the cancel message at 1216, the source SgNB 802 refrains from conditionally preconfiguring PScell2/SCG2 within a predefined time interval.

Figure 13:
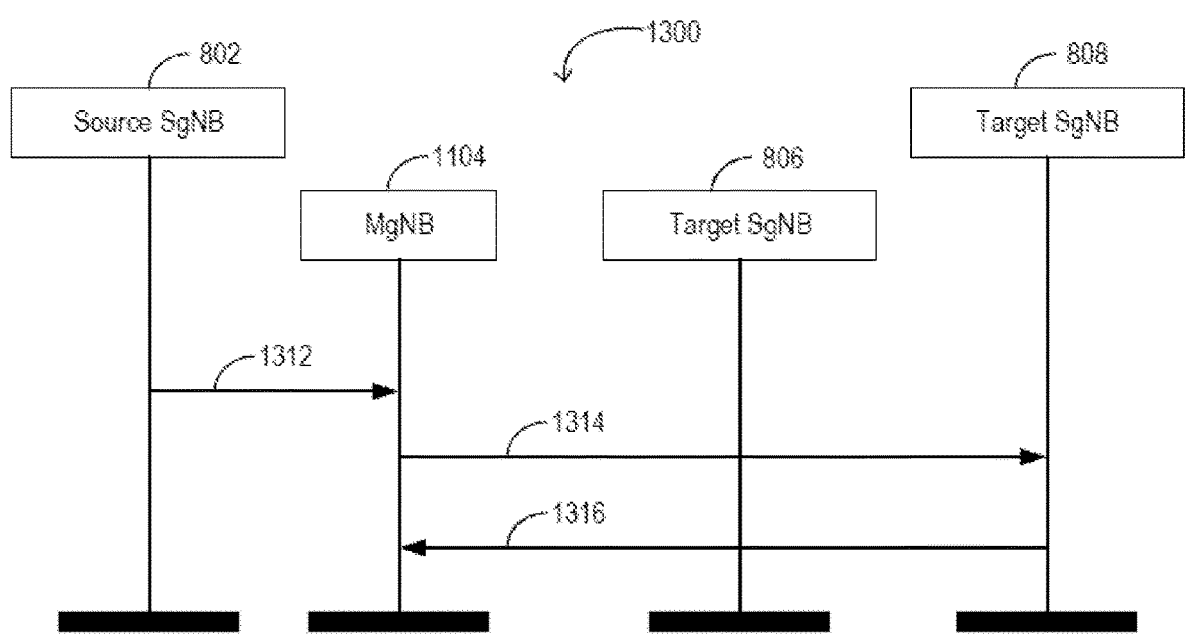
FIG. 13 is a signal diagram illustrating a method for performing a conditional SN change, in accordance with some embodiments of the present disclosure.

FIG. 13 is a signal diagram illustrating a method 1300 for performing a conditional SN change, in accordance with some embodiments of the present disclosure. Referring to FIGS. 6-13, the method 1300 involves the source SgNB 802, the MgNB 1104, the first target SgNB 806, and the second target SgNB 808. A UE (not shown) is currently in a dual-connectivity operation (e.g., NR-DC@5GC operation). That is, the MgNB 1104 and the source SgNB 802 are currently configured to provide communication services for the UE. The MgNB 1104 selects and conditionally preconfigures the first target SgNB 806 according to the LIE mobility and RRM measurement report received from the UE. The first target SgNB 806 includes PScell1/SCG1. The source SgNB 802 selects and conditionally preconfigures the second target SgNB 808 according to the UE mobility and RRM measurement report received from the UE. The second target SgNB 808 includes PScell2/SCG2.

As the source SgNB 802 locally experiences policy adjustment, the source SgNB 802 determines to cancel the second target SgNB 808 and communication resources associated therewith, where the second target SgNB 808 had been selected and conditionally preconfigured or prepared by the source SgNB 802. In response to the source SgNB 802 determining that the second target SgNB 808 cannot be the candidate target SN for the UE, the source SgNB 802 timely releases, cancels, or deletes the communication resources of the second target SgNB 808, and timely recycles the communication resources. The MgNB 1104 has established UE-associated signaling connections with the source SgNB 802, the first target SgNB 806, and the second target SgNB 808 to carry or otherwise communicate UE-specific signaling in the manner described herein.

For example, at 1312, the source SgNB 802 sends to the MgNB 1104, a request message requesting the MgNB 1104 to release, cancel, or delete the conditionally preconfigured or prepared PScell2/SCG2 and communication resources associated therewith. In some implementations, the request message is an XnAP: Conditional PScell Cancel UE-associated message. In response to determining that PScell2/SCG2 is uniquely associated with the M-NG-RAN node UE XnAP ID and the S-NG-RAN node UE XnAP ID associated with the UE-specific message, an identifier of the PScell2/SCG2 is not needed. On the other hand, in response to determining that PScell2/SCG2 cannot be uniquely associated with the M-NG-RAN node UE XnAP ID or the S-NG-RAN node UE XnAP ID associated with the UE-specific message, the PScell2/SCG2 identifier needs to be included to identify PScell2/SCG2.

Responsive to the request message received at 1312, the MgNB 1104 sends to the second target SgNB 808, a request message requesting the second target SgNB 808 to release, cancel, or delete indication information and Cause of the conditionally preconfigured or prepared PScell2/SCG2, at 1314. In some implementations, the request message is an XnAP:S-Node Release Request UE-associated message. In response to determining that PScell2/SCG2 is uniquely associated with the M-NG-RAN node UE XnAP ID and the S-NG-RAN node UE XnAP ID associated with the UE-specific message, an identifier of the PScell2/SCG2 is not needed. On the other hand, in response to determining that PScell2/SCG2 cannot be uniquely associated with the M-NG-RAN node UE XnAP ID or the S-NG-RAN node UE XnAP ID associated with the UE-specific message, the PScell2/SCG2 identifier needs to be included to identify PScell2/SCG2.

Responsive to the request received at 1314, the second target SgNB 808 releases, cancels, or deletes PScell2/SCG2 and communication resources associated therewith. At 1316, the second target SgNB 808 replies to the request received at 1314 by sending a request acknowledge message (e.g., a XnAP:S-Node Release Request Acknowledge UE-associated message) to the MgNB 1104. Responsive to receiving the cancel message at 1316, the source SgNB 802 refrains from conditionally preconfiguring PScell2/SCG2 within a predefined time interval.

Figure 14A:
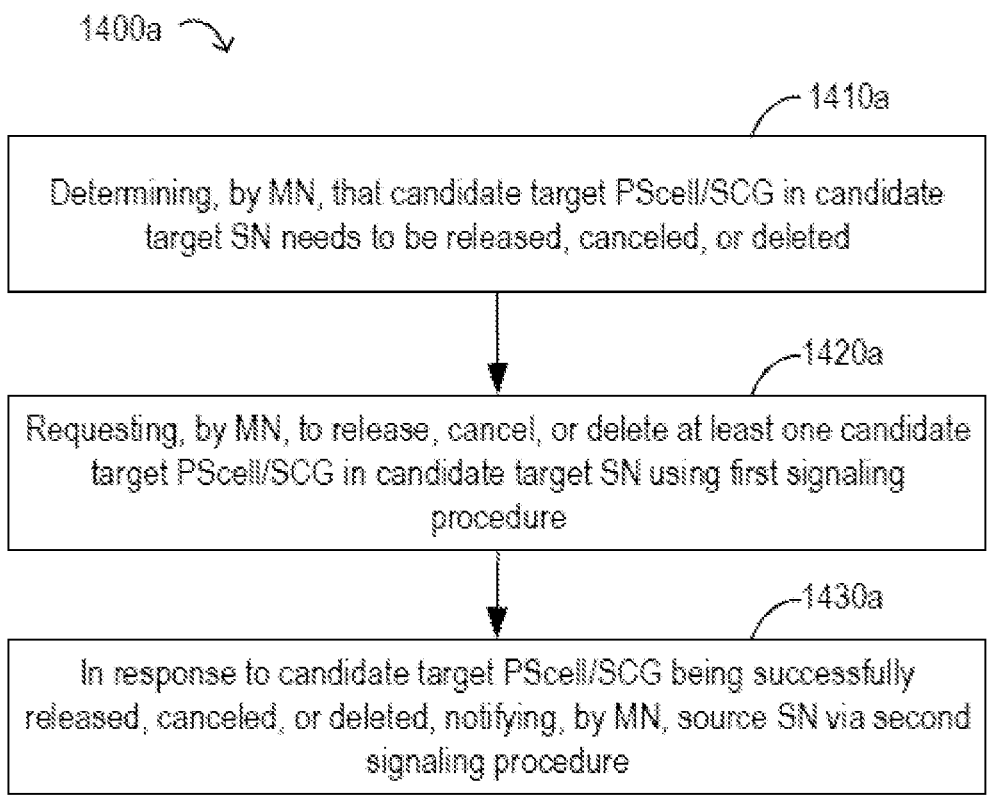
FIG. 14A is a flow diagram illustrating a method for performing a conditional SN change, in accordance with some embodiments of the present disclosure.

FIG. 14A is a flow diagram illustrating a method 1400a for performing a conditional SN change, in accordance with some embodiments of the present disclosure. Referring to FIGS. 6-8, 11, and 14A, in some implementations, a MN as described herein can actively trigger/initiate the release, cancelation, or deletion of the candidate target PScell/SCG resources in the candidate target SN.

At 1410a, the MN determines that a candidate target PScell/SCG in a candidate target SN needs to be released, canceled, or deleted. The candidate target SN is involved in a conditional SN addition or change MR-DC procedure of a UE. The MN and a source SN are currently configured to provide communication services to the UE. The UE is in a multi-connectivity MR-DC operation. The first signaling procedures is a Class1 MN-initiated SN Release Request/Acknowledge signaling procedure. The candidate target SN is selected and conditionally preconfigured and prepared by the MN, or the candidate target SN is selected and conditionally preconfigured and prepared by the source SN.

At 1420a, the MN requests to release, cancel, or delete the at least one candidate target PScell/SCG in the candidate target SN using a first signaling procedure. The candidate target PScell/SCG is identified using a PScell/SCG-related cell (group) ID, an ID List, or a UE-associated interface application protocol ID. The UE-associated interface application protocol ID corresponds to a UE-dedicated signaling connection used by SN release signaling procedure specific to the UE. In the embodiments in which a single message in the first signaling procedure can be used to release, cancel, or delete multiple different candidate PScells/SCGs in the same target candidate SN (e.g., the PScell/SCG includes multiple PScells/SCGs), the ID List includes the IDs corresponding to the different candidate PScell/SCG in the same target candidate SN. In some examples, the UE-associated interface application protocol ID comprises a UE X2AP ID or a UE XnAP ID.

At 1430a, in response to the candidate target PScell/SCG being successfully released, canceled, or deleted, the MN notifies the source SN via a second signaling procedure that the concerned candidate target PScell/SCG in the candidate target SN has been released, canceled, or deleted. The second signaling procedure is a Class2 Conditional PScell Cancel signaling procedure. The Class2 Conditional PScell Cancel signaling procedure carrying a concerned PScell/SCG-related cell (group) ID, an ID List (identifying multiple PScells/SCGs), or a UE-associated interface application protocol ID. Responsive to being notified, the source SN learns a status and cause for releasing the candidate target PScell/SCG.

Figure 14B:
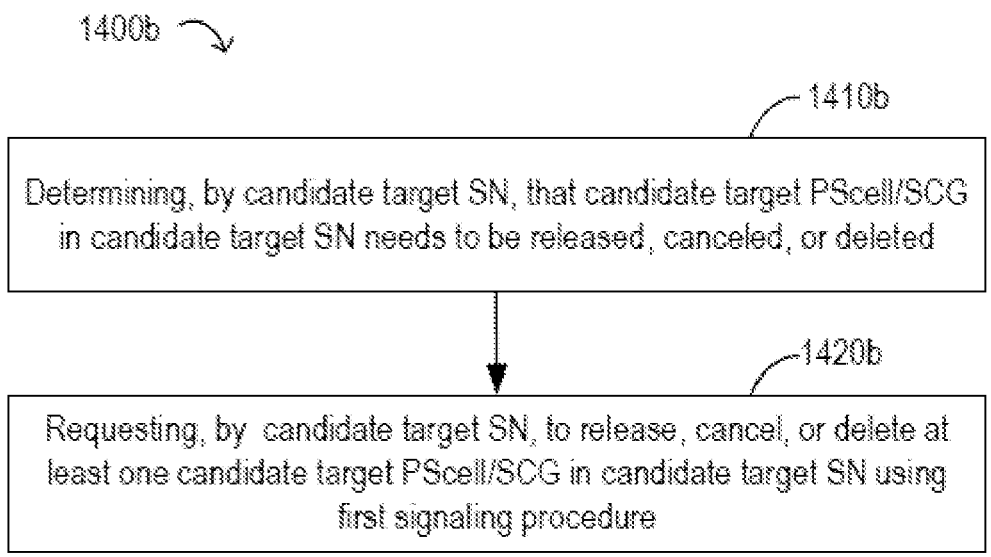
FIG. 14B is a flow diagram illustrating a method for performing a conditional SN change, in accordance with some embodiments of the present disclosure.

FIG. 14B is a flow diagram illustrating a method for performing a conditional SN change, in accordance with some embodiments of the present disclosure. Referring to FIGS. 6, 7, 9, 12, and 14B, in some implementations, the candidate target SN actively triggers/initiates the release, cancelation, or deletion of the candidate target PScell/SCG resources of the candidate target SN itself. The candidate target SN is involved in a conditional SN addition or change MR-DC procedure of a UE. A MN and a source SN are currently configured to provide communication services to the UE. The UE is in a multi-connectivity MR-DC operation.

At 1410b, the candidate target SN determines that a candidate target PScell/SCG in the candidate target SN needs to be released, canceled, or deleted. The candidate target SN is selected and conditionally preconfigured and prepared by the MN, or the candidate target SN is selected and conditionally preconfigured and prepared by the source SN.

The candidate target PScell/SCG is identified using a PScell/SCG-related cell (group) ID, an ID List, or a UE-associated interface application protocol ID. The UE-associated interface application protocol ID corresponding to the UE-dedicated signaling connection used by SN release signaling procedure specific to the UE. In the embodiments in which a single message in the first signaling procedure can be used to release, cancel, or delete multiple different candidate PScells/SCGs in the same target candidate SN (e.g., the PScell/SCG includes multiple PScells/SCGs), the ID List includes the IDs corresponding to the different candidate PScell/SCG in the same target candidate SN. In some examples, the UE-associated interface application protocol ID comprises a UE X2AP ID or a UE XnAP ID.

At 1420b, the candidate target SN requests to release, cancel, or delete the at least one candidate target PScell/SCG in the candidate target SN itself using a first signaling procedure. The first signaling procedures is a Class1 target SN-initiated SN Release Required/Confirm signaling procedure.

In some embodiments, in response to the candidate target PScell/SCG being successfully released, canceled, or deleted, the MN notifies the source SN via a second signaling procedure that the concerned candidate target PScell/SCG in the candidate target SN has been released, canceled, or deleted. The second signaling procedure is a Class2 Conditional PScell Cancel signaling procedure. The Class2 Conditional PScell Cancel signaling procedure carrying a concerned PScell/SCG-related cell (group) ID, an ID List (identifying multiple PScells/SCGs), or a UE-associated interface application protocol ID. Responsive to being notified, the source SN learns a status and cause for releasing the candidate target PScell/SCG.

Figure 14C:
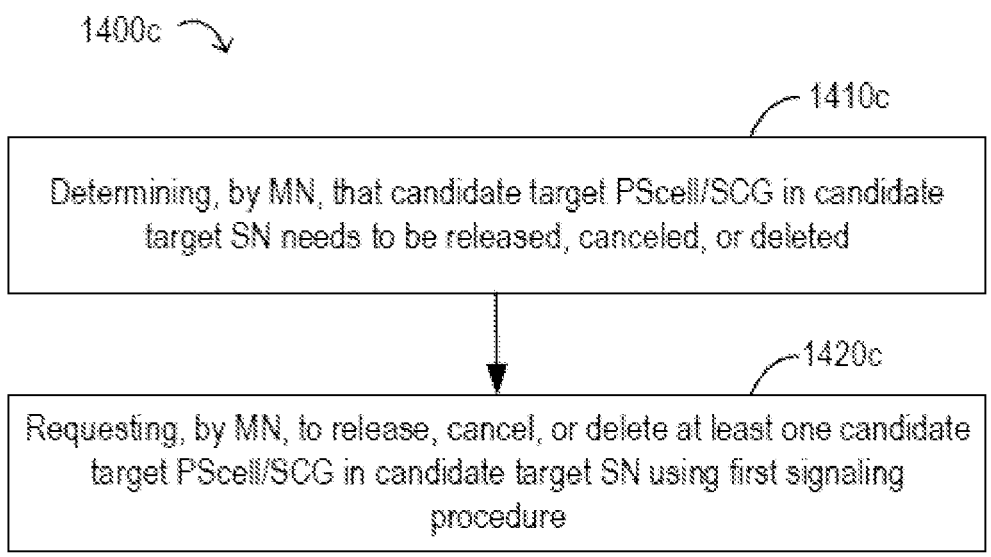
FIG. 14C is a flow diagram illustrating a method for performing a conditional SN change, in accordance with some embodiments of the present disclosure.

FIG. 14C is a flow diagram illustrating a method for performing a conditional SN change, in accordance with some embodiments of the present disclosure. Referring to FIGS. 6, 7, 10, 13, and 14C, in some implementations, the source SN actively triggers/initiates the release, cancelation, or deletion of the candidate target PScell/SCG resources in the candidate target SN. The candidate target SN is involved in a conditional SN addition or change MR-DC procedure of a UE. A MN and a source SN are currently configured to provide communication services to the UE. The UE is in a multi-connectivity MR-DC operation.

At 1410*c*, the source SN determines that a candidate target primary secondary cell (PScell)/secondary cell group (SCG) in a candidate target secondary node (SN) needs to be released, canceled, or deleted. The candidate target SN is selected and conditionally preconfigured and prepared by the source SN At 1420*c*, the source SN requests the MN to release, cancel, or delete the at least one candidate target PScell/SCG in the candidate target SN using a first signaling procedure. The first signaling procedures is a Class2 source SN-initiated Conditional PScell Cancel signaling procedure. The candidate target PScell/SCG is identified using a PScell/SCG-related cell (group) ID, an ID List, or a UE-associated interface application protocol ID, the UE-associated interface application protocol ID corresponding to a UE-dedicated signaling connection used by Conditional PScell Cancel signaling procedure specific to the UE. The UE-associated interface application protocol ID comprises a UE X2AP ID or a UE XnAP ID.

In some embodiments, in response to the candidate target PScell/SCG being successfully released, canceled, or deleted, the MN notifies the source SN via a second signaling procedure that the concerned candidate target PScell/SCG in the candidate target SN has been released, canceled, or deleted. The second signaling procedure is a Class2 Conditional PScell Cancel signaling procedure. The Class2 Conditional PScell Cancel signaling procedure carrying a concerned PScell/SCG-related cell (group) ID, an ID List (identifying multiple PScells/SCGs), or a UE-associated interface application protocol ID. Responsive to being notified, the source SN learns a status and cause for releasing the candidate target PScell/SCG.

FIG. 15A illustrates a block diagram of an example base station 1502, in accordance with some embodiments of the present disclosure. FIG. 15B illustrates a block diagram of an example UE 1501, in accordance with some embodiments of the present disclosure. Referring to FIGS. 1-15B, the UE 1501 (or a wireless communication device) is an example implementation of the UEs described herein, and the base station 1502 is an example implementation of the base stations and nodes described herein.

The base station 1502 and the UE 1501 can include components and elements configured to support known or conventional operating features that need not be described in detail herein. In one illustrative embodiment, the base station 1502 and the UE 1501 can be used to communicate (e.g., transmit and receive) data symbols in a wireless communication environment, as described above. For instance, the base station 1502 can be a base station (e.g., gNBs, eNBs, and so on), a server, a node, or any suitable computing device used to implement various network functions.

The base station 1502 includes a transceiver module 1510, an antenna 1512, a processor module 1514, a memory module 1516, and a network communication module 1518. The module 1510, 1512, 1514, 1516, and 1518 are operatively coupled to and interconnected with one another via a data communication bus 1520. The UE 1501 includes a UE transceiver module 1530, a UE antenna 1532, a UE memory module 1534, and a UE processor module 1536. The modules 1530, 1532, 1534, and 1536 are operatively coupled to and interconnected with one another via a data communication bus 1540. The base station 1502 communicates with the UE 1501 or another base station via a communication channel, which can be any wireless channel or other medium suitable for transmission of data as described herein.

As would be understood by persons of ordinary skill in the art, the base station 1502 and the UE 1501 can further include any number of modules other than the modules shown in FIGS. 15A and 15B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 1530 includes a radio frequency (RF) transmitter and a RF receiver each including circuitry that is coupled to the antenna 1532. A duplex switch (not shown) may alternatively couple the RF transmitter or receiver to the antenna in time duplex fashion. Similarly, in accordance with some embodiments, the transceiver 1510 includes an RF transmitter and a RF receiver each having circuitry that is coupled to the antenna 1512 or the antenna of another base station. A duplex switch may alternatively couple the RF transmitter or receiver to the antenna 1512 in time duplex fashion. The operations of the two transceiver modules 1510 and 1530 can be coordinated in time such that the receiver circuitry is coupled to the antenna 1532 for reception of transmissions over a wireless transmission link at the same time that the transmitter is coupled to the antenna 1512. In some embodiments, there is close time synchronization with a minimal guard time between changes in duplex direction.

The UE transceiver 1530 and the transceiver 1510 are configured to communicate via the wireless data communication link and cooperate with a suitably configured RF antenna arrangement 1512/1532 that can support a particular wireless communication protocol and modulation scheme. In some illustrative embodiments, the UE transceiver 1510 and the transceiver 1510 are configured to support industry standards such as the Long Term Evolution (LTE) and emerging 5G standards, and the like. It is understood, however, that the present disclosure is not necessarily limited in application to a particular standard and associated protocols. Rather, the UE transceiver 1530 and the base station transceiver 1510 may be configured to support alternate, or additional, wireless data communication protocols, including future standards or variations thereof.

The transceiver 1510 and the transceiver of another base station (such as but not limited to, the transceiver 1510) are configured to communicate via a wireless data communication link and cooperate with a suitably configured RF antenna arrangement that can support a particular wireless communication protocol and modulation scheme. In some illustrative embodiments, the transceiver 1510 and the transceiver of another base station are configured to support industry standards such as the LTE and emerging 5G standards, and the like. It is understood, however, that the present disclosure is not necessarily limited in application to a particular standard and associated protocols. Rather, the transceiver 1510 and the transceiver of another base station may be configured to support alternate, or additional, wireless data communication protocols, including future standards or variations thereof.

In accordance with various embodiments, the base station 1502 may be a base station such as but not limited to, an eNB, gNB, ng-eNB, a femto station, or a pico station, for example. In some embodiments, the UE 1501 may be embodied in various types of user devices such as a mobile phone, a smart phone, a personal digital assistant (PDA), tablet, laptop computer, wearable computing device, etc. The processor modules 1514 and 1536 may be implemented, or realized, with a general-purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 1514 and 1536, respectively, or in any practical combination thereof. The memory modules 1516 and 1534 may be realized as RAM memory, flash memory, ROM memory, EPROM memory, EEPROM memory, registers, a hard disk, a removable disk, a CD-ROM, or any other form of storage medium known in the art. In this regard, memory modules 1516 and 1534 may be coupled to the processor modules 1510 and 1530, respectively, such that the processors modules 1510 and 1530 can read information from, and write information to, memory modules 1516 and 1534, respectively. The memory modules 1516 and 1534 may also be integrated into their respective processor modules 1510 and 1530. In some embodiments, the memory modules 1516 and 1534 may each include a cache memory for storing temporary variables or other intermediate information during execution of instructions to be executed by processor modules 1510 and 1530, respectively. Memory modules 1516 and 1534 may also each include non-volatile memory for storing instructions to be executed by the processor modules 1510 and 1530, respectively.

The network communication module 1518 generally represents the hardware, software, firmware, processing logic, and/or other components of the base station 1502 that enable bi-directional communication between the transceiver 1510 and other network components and communication nodes in communication with the base station 1502. For example, the network communication module 1518 may be configured to support internet or WiMAX traffic. In a deployment, without limitation, the network communication module 1518 provides an 802.3 Ethernet interface such that the transceiver 1510 can communicate with a conventional Ethernet based computer network. In this manner, the network communication module 1518 may include a physical interface for connection to the computer network (e.g., Mobile Switching Center (MSC)). In some embodiments in which the base station 1502 is an IAB donor, the network communication module 1518 includes a fiber transport connection configured to connect the base station 1502 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
   determining, by a master node (MN), that a candidate target primary secondary cell (PScell) in a candidate target secondary node (SN) is to be released, canceled, or deleted, the candidate target SN is involved in a conditional SN addition or change multi-RAT dual connectivity (MR-DC) procedure of a wireless communication device, the MN and a source SN are currently configured to provide communication services to the wireless communication device, the candidate target SN is selected by the MN or the source SN, the source SN being different from the candidate target SN; and
   requesting, by the MN, to release, cancel, or delete the candidate target PScell in the candidate target SN using a first signaling procedure when the MN and the source SN are currently configured to provide the communication services to the wireless communication device and before handing over the communication services to the at least one candidate target PScell in the candidate target SN.

2. The wireless communication method of claim 1, wherein the wireless communication device is in a multi-connectivity MR-DC operation.

3. The wireless communication method of claim 1, wherein the first signaling procedure is a Class1 MN-initiated SN Release Request/Acknowledge signaling procedure.

4. The wireless communication method of claim 1, wherein
   the candidate target SN is conditionally preconfigured and prepared by the MN; or
   the candidate target SN is conditionally preconfigured and prepared by the source SN.

5. The wireless communication method of claim 1, wherein the candidate target PScell is identified using a PScell-related cell (group) identifier (ID), an ID List, or a UE-associated interface application protocol ID, the UE-associated interface application protocol ID corresponding to a UE-dedicated signaling connection used by a SN release signaling procedure specific to the wireless communication device.

6. The wireless communication method of claim 5, wherein the UE-associated interface application protocol ID comprises a UE X2AP ID or a UE XnAP ID.

7. The wireless communication method of claim 1, further comprising in response to the candidate target PScell being successfully released, canceled, or deleted, notifying the source SN by the MN via a second signaling procedure that the candidate target PScell in the candidate target SN has been released, canceled, or deleted.

8. The wireless communication method of claim 7, wherein the second signaling procedure is a Class2 Conditional PScell Cancel signaling procedure, the Class2 Conditional PScell Cancel signaling procedure carrying a PScell-related cell (group) identifier (ID), an ID List, or a UE-associated interface application protocol ID.

9. A wireless communication apparatus comprising at least one processor configured to:
   determine that a candidate target primary secondary cell (PScell) in a candidate target secondary node (SN) is to be released, canceled, or deleted, the candidate target SN is involved in a conditional SN addition or change multi-RAT dual connectivity (MR-DC) procedure of a wireless communication device, the MN and a source SN are currently configured to provide communication services to the wireless communication device, the candidate target SN is selected by the MN or the source SN, the source SN being different from the candidate target SN; and request to release, cancel, or delete the candidate target PScell in the candidate target SN using a first signaling procedure when the MN and the source SN are currently configured to provide the communication services to the wireless communication device and before handing over the communication services to the at least one candidate target PScell in the candidate target SN.

10. At least one non-transitory computer-readable medium comprising a computer-readable program medium code stored thereupon, the code, when executed by at least one processor, causing the at least one processor to implement the method recited in claim 1.

11. A wireless communication method, comprising:
determining, by a candidate target secondary node (SN) involved in a conditional SN addition or change multi-RAT dual connectivity (MR-DC) procedure of a wireless communication device, that a candidate target primary secondary cell (PScell) in the candidate target SN is to be released, canceled, or deleted, a master node (MN) and a source SN are currently configured to provide communication services to the wireless communication device, the candidate target SN is selected by the MN or the source SN, the source SN being different from the candidate target SN; and requesting, by the candidate target SN, to release, cancel, or delete the candidate target PScell in the candidate target SN using a first signaling procedure when the MN and the source SN are currently configured to provide the communication services to the wireless communication device and before handing over the communication services to the at least one candidate target PScell in the candidate target SN.

12. The wireless communication method of claim 11, wherein the wireless communication device is in a multi-connectivity MR-DC operation.

13. The wireless communication method of claim 11, wherein the first signaling procedure is a Class1 target SN-initiated SN Release Required/Confirm signaling procedure.

14. The wireless communication method of claim 11, wherein
the candidate target SN is conditionally preconfigured and prepared by the MN; or
the candidate target SN is conditionally preconfigured and prepared by the source SN.

15. The wireless communication method of claim 11, wherein the candidate target PScell is identified using a PScell-related cell (group) identifier (ID), an ID List, or a UE-associated interface application protocol ID, the UE-associated interface application protocol ID corresponding to the UE-dedicated signaling connection used by a SN release signaling procedure specific to the wireless communication device.

16. The wireless communication method of claim 15, wherein UE-associated interface application protocol ID comprises a UE X2AP ID or a UE XnAP ID.

17. The wireless communication method of claim 11, wherein in response to the candidate target PScell being successfully released, canceled, or deleted, the MN notifies the source SN via a second signaling procedure that the candidate target PScell in the candidate target SN has been released, canceled, or deleted.

18. The wireless communication method of claim 17, wherein the second signaling procedure is a Class2 Conditional PScell Cancel signaling procedure, the Class2 Conditional PScell Cancel signaling procedure carrying a concerned PScell-related cell (group) identifier (ID), an ID List, or a UE-associated interface application protocol ID.

19. A wireless communication apparatus comprising at least one processor configured to implement the method recited in claim 11.

20. At least one non-transitory computer-readable medium comprising a computer-readable program medium code stored thereupon, the code, when executed by at least one processor, causing the at least one processor to implement the method recited in claim 11.

* * * * *